US 11,410,284 B2

United States Patent
Wang et al.

(10) Patent No.: US 11,410,284 B2
(45) Date of Patent: Aug. 9, 2022

(54) FACE BEAUTIFICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Qianyi Wang, Shenzhen (CN); Xueyuan Xing, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 17/194,880

(22) Filed: Mar. 8, 2021

(65) Prior Publication Data
US 2021/0192703 A1 Jun. 24, 2021

Related U.S. Application Data

(63) Continuation of application No. PCT/CN2019/117475, filed on Nov. 12, 2019.

(30) Foreign Application Priority Data

Nov. 30, 2018 (CN) .......................... 201811453182.2

(51) Int. Cl.
*G06T 5/50* (2006.01)
*G06T 7/11* (2017.01)
(Continued)

(52) U.S. Cl.
CPC .............. *G06T 5/50* (2013.01); *G06T 3/0012* (2013.01); *G06T 3/0056* (2013.01); *G06T 3/20* (2013.01);
(Continued)

(58) Field of Classification Search
CPC .................................... G06T 5/50; G06T 7/11
See application file for complete search history.

(56) References Cited

FOREIGN PATENT DOCUMENTS

| CN | 104574299 A | * | 4/2015 |
| CN | 104574299 A |   | 4/2015 |

(Continued)

OTHER PUBLICATIONS

Fan, X., Chai, Z., Feng, Y., Wang, Y., Wang, S. and Luo, Z., 2016. An efficient mesh-based face beautifier on mobile devices. Neurocomputing, 172, pp. 134-142 (Year: 2016).*

(Continued)

*Primary Examiner* — Shivang I Patel
(74) *Attorney, Agent, or Firm* — Morgan, Lewis & Bockius LLP

(57) ABSTRACT

A face beautification method is performed by a computer device, the method including: obtaining a target face contained in a target image and a user-selected reference face; generating adjustment parameters corresponding to the target face based on a comparison of the target face and the reference face, the adjustment parameters comprising face shape adjustment parameters and facial part adjustment parameters; generating a displacement vector according to the face shape adjustment parameters and the facial part adjustment parameters, the displacement vector being used for representing a size change, a position change and an angle change in a face shape and facial parts of the target face during an adjustment process; adjusting the face shape and the facial parts of the target face according to the displacement vector; and displaying the adjusted target face.

19 Claims, 12 Drawing Sheets

(51) Int. Cl.
    *G06T 3/00*         (2006.01)
    *G06T 3/20*         (2006.01)
    *G06T 3/40*         (2006.01)
    *G06T 11/60*       (2006.01)
    *G06V 40/16*       (2022.01)

(52) U.S. Cl.
    CPC .................. *G06T 3/40* (2013.01); *G06T 7/11* (2017.01); *G06T 11/60* (2013.01); *G06V 40/171* (2022.01); *G06T 2200/24* (2013.01); *G06T 2207/20021* (2013.01); *G06T 2207/20072* (2013.01); *G06T 2207/30201* (2013.01)

(56) References Cited

FOREIGN PATENT DOCUMENTS

| | | | |
|---|---|---|---|
| CN | 105096353 A | 11/2015 | |
| CN | 107705248 A | 2/2018 | |
| CN | 108876732 A | 11/2018 | |
| CN | 109584151 A | 4/2019 | |

OTHER PUBLICATIONS

Tencent Technology, WO, PCT/CN2019/117475, Feb. 14, 2020, 4 pgs.
Tencent Technology, IPRP, PCT/CN2019/117475, May 25, 2021, 5 pgs.
Tencent Technology, ISR, PCT/CN2019/117475, Feb. 14, 2020, 2 pgs.

\* cited by examiner

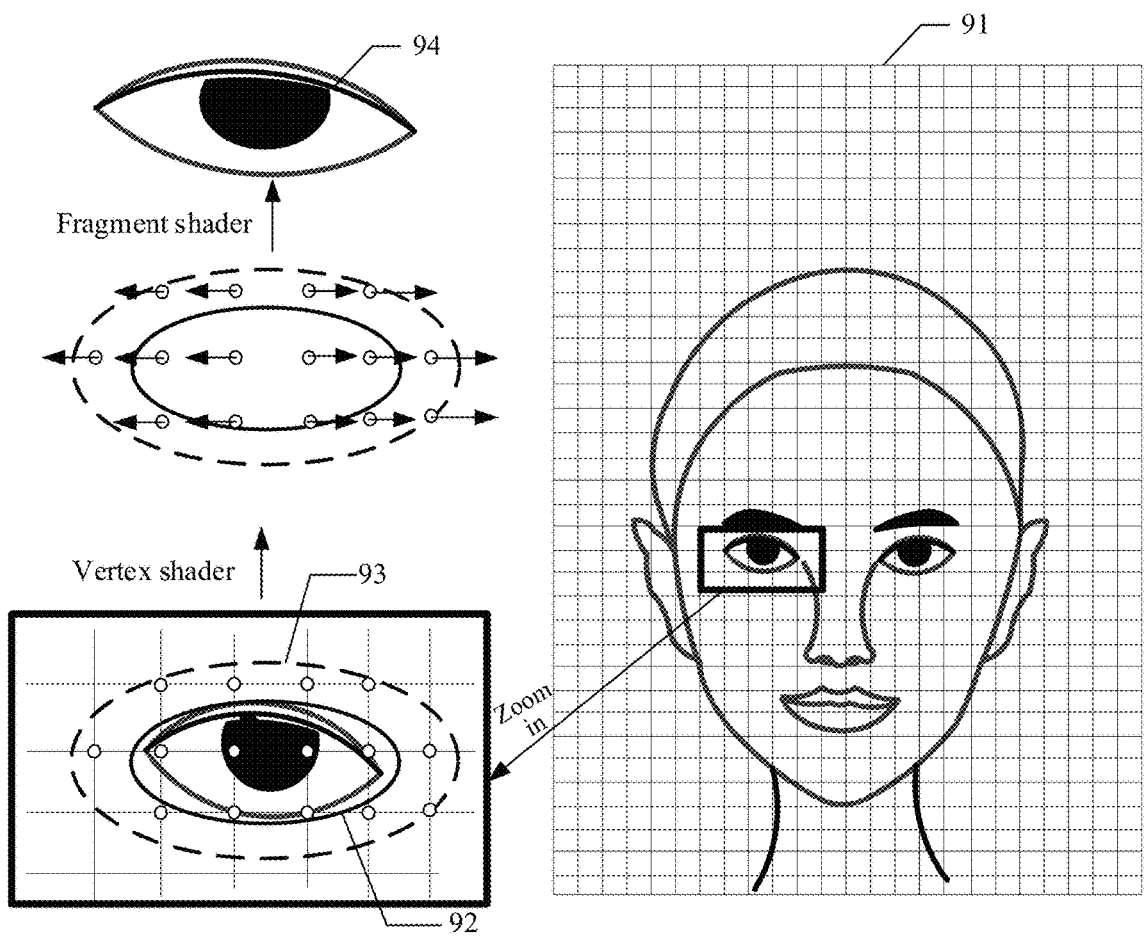

FIG. 9

Divide the target face into facial regions according to the key-point types of the facial key-points, the facial regions including contour regions and facial part regions — 608A Determine an adjustment region corresponding to each facial region, an area of the adjustment region being larger than an area of the facial region, and the facial region being located inside the adjustment region — 608B

FIG. 10

FACE BEAUTIFICATION METHOD AND APPARATUS, COMPUTER DEVICE, AND STORAGE MEDIUM

CROSS REFERENCE TO RELATED APPLICATIONS

This application is a continuation application of PCT Patent Application No. PCT/CN2019/117475, entitled "FACE BEAUTIFICATION METHOD AND APPARATUS, AND COMPUTER DEVICE AND STORAGE MEDIUM" filed on Nov. 12, 2019, which claims priority to Chinese Patent Application No. 201811453182.2, filed with the State Intellectual Property Office of the People's Republic of China on Nov. 30, 2018, and entitled "FACE BEAUTIFICATION METHOD AND APPARATUS, TERMINAL, AND STORAGE MEDIUM", all of which are incorporated herein by reference in their entirety.

FIELD OF THE TECHNOLOGY

Embodiments of this application relate to the field of image processing, and in particular, to a face beautification method and apparatus, a computer device, and a storage medium.

BACKGROUND OF THE APPLICATION

A beautification application is an application that beautifies a face in a screen. A user may use a beautification application to perform real-time beautification during photographing, or use the beautification application to beautify a captured photo.

In the related art, when using a beautification application, a user may adjust the face shape and facial parts of a face in an image through manually pushing and pulling, or the like. For example, for the face in the image, the user may push and pull the face contour to implement a face slimming function, or push and pull the facial parts to zoom in or out a partial region of the facial parts.

However, because the user cannot precisely control the scale of adjustment when the user manually pushes and pulls the face for adjustment, this pushing and pulling adjustment needs to be repeated for a plurality of times, which results in relatively low face beautification efficiency and a poor beautification effect.

SUMMARY

According to embodiments provided in this application, a face beautification method and apparatus, a computer device, and a storage medium are provided.

According to an aspect, an embodiment of this application provides a face beautification method, performed by a computer device, the method including:

obtaining a target face contained in a target image and a user-selected reference face;

generating adjustment parameters corresponding to the target face based on a comparison of the target face and the reference face, the adjustment parameters comprising face shape adjustment parameters and facial part adjustment parameters;

generating a displacement vector according to the face shape adjustment parameters and the facial part adjustment parameters, the displacement vector being used for representing a size change, a position change and an angle change in a face shape and facial parts of the target face during an adjustment process;

adjusting the face shape and the facial parts of the target face according to the displacement vector; and displaying the adjusted target face.

According to another aspect, an embodiment of this application provides a face beautification apparatus, the apparatus including:

an obtaining module, configured to obtain a target face contained in a target image and a user-selected reference face;

a first generation module, configured to generate adjustment parameters corresponding to the target face based on a comparison of the target face and the reference face, the adjustment parameters comprising face shape adjustment parameters and facial part adjustment parameters;

a second generation module, configured to generate a displacement vector according to the face shape adjustment parameters and the facial part adjustment parameters, the displacement vector being used for representing a size change, a position change and an angle change in a face shape and facial parts of the target face during an adjustment process; an adjustment module, configured to adjust the face shape and the facial parts of the target face according to the displacement vector; and a display module, configured to display the adjusted target face.

According to another aspect, a computer device is provided, including a processor and a memory, the memory storing computer-readable instructions, the computer-readable instructions, when executed by the processor, causing the processor to perform the steps of the face beautification method.

According to another aspect, a non-transitory computer-readable storage medium is provided, storing computer-readable instructions, the computer-readable instructions, when executed by one or more processors, causing the one or more processors to perform the steps of the face beautification method.

According to another aspect, this application further provides a computer program product including instructions, the product, when run on a computer, causing the computer to perform the face beautification method according to the foregoing aspects.

Details of one or more embodiments of this application are provided in the accompanying drawings and descriptions below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other drawings according to these accompanying drawings without creative efforts.

FIG. 9 shows a schematic diagram of implementation of a process of adjusting a block vertex and redrawing pixels according to an embodiment of this application.

FIG. 10 shows a flowchart of a face beautification method according to another embodiment of this application.

DESCRIPTION OF EMBODIMENTS

To make the objectives, technical solutions, and advantages of this application clearer, the following further describes implementations of this application in detail with reference to the drawings.

To facilitate understanding, the following explains terms involved in the embodiments of this application.

Facial key-points: Points used for locating feature points on a face. The feature points may be feature points of facial parts (eyebrows, eyes, mouth, nose, ears) and face contour key-points. Generally, the facial key-points are outputted by a facial key-point detection model after a face image is inputted to the facial key-point detection model. In addition, according to the accuracy, the facial key-points may be divided into 5 points, 68 points, 83 points and 90 points.

Shaders: Programs in a programmable rendering pipeline are referred to as shaders. According to functions, the shaders include vertex shaders and fragment shaders (or referred to as pixel shaders). The vertex shader is used for processing vertex data, that is, to determine a position of a vertex in a graph; and the fragment shader is used for processing pixel data, that is, to render and color each pixel in the graph. When graphic rendering is performed, the vertex shader is usually first used to render the vertex of the graphic, and then the fragment shader is used to render pixels in a vertex triangle (formed by three connected vertices).

Face template: A template used for describing facial features, which includes face shape data and facial part data. Optionally, the face shape data includes at least one of the following: an overall face shape, a forehead height, a forehead width, a chin height, or a chin width; and the facial part data includes at least one of the following: sizes of eyes, a distance between the eyes, longitudinal positions of the eyes, horizontal positions of the eyes, a nose size, a nose height, a longitudinal position of the nose, a nose wing size, a nose tip size, a mouth size, a lateral position of the mouth, a lip thickness, longitudinal positions of eyebrows, a distance between the eyebrows.

Figure 1:
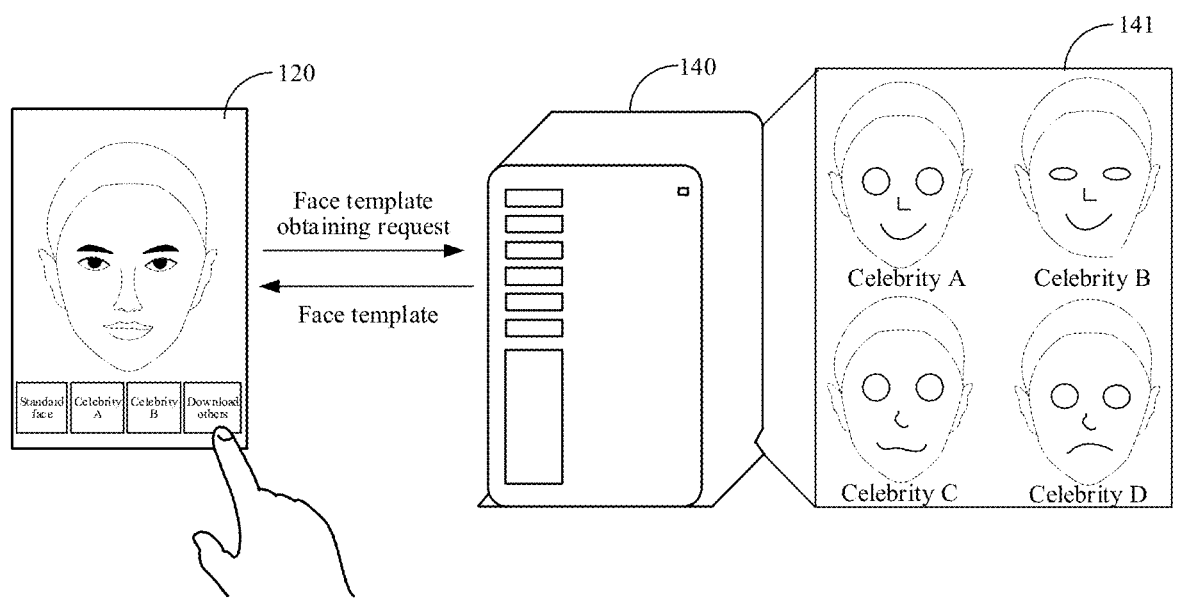
FIG. 1 shows a schematic diagram of an implementation environment according to an embodiment of this application.

FIG. 1 shows a schematic diagram of an implementation environment according to an embodiment of this application. The implementation environment includes a terminal 120 and a server 140.

The terminal 120 is an electronic device installed with a beautification application, and the electronic device may be a smartphone, a tablet computer, a personal computer, or the like. In FIG. 1, description is made by using an example in which the terminal 120 is a smartphone.

The beautification application may be a picture processing application with a beautification function, and the picture processing application is used for beautifying a face in a captured photo or downloaded picture. Alternatively, the beautification application may be a camera application with a beautification function, and the camera application is used for beautifying a face contained in an image currently collected by the terminal 120. Alternatively, the beautification application may be a live streaming application with a beautification function. The live streaming application is used for beautifying a face in a collected image and then pushing, via a live streaming server, local video stream data to other clients through which the live streaming is watched. Alternatively, the beautification application may be a short video application with a beautification function. The short video application is used for beautifying a face during a short video capturing process and releasing a captured short video to a short video platform for other users to click and watch. A specific type of the beautification application is not limited in the embodiments of this application.

The terminal 120 is connected to the server 140 through a wired or wireless network.

The server 140 is one server, a server cluster formed by several servers, or a cloud computing center. In an embodiment of this application, the server 140 is a backend server of a beautification application in the terminal 120.

In a possible implementation, as shown in FIG. 1, a face template library 141 of the server 140 stores several face templates. When a beautification application needs to update a local face template or obtain a new face template, the terminal 120 sends a face template obtaining request to the server 140, and receives face template data fed by the server 140. Then the beautification application can perform face beautification based on the face template. The face template may be a template made according to the face of a celebrity.

In a possible application scenario, when the face beautification method provided in this embodiment of this application is applied to the terminal 120, the terminal 120 locally beautifies a face in an image through the beautification application, and displays the beautified image; and when the face beautification method provided in this embodiment of this application is applied to the server 140, the terminal 120 uploads an image to the server 140, the server 140 beautifies a face in the image, and sends the beautified image to the terminal 120 for displaying.

Optionally, the wireless network or the wired network uses a standard communication technology and/or protocol. The network is usually the Internet, but may alternatively be any other networks, including but not limited to a local area network (LAN), a metropolitan area network (MAN), a wide area network (WAN), a mobile, wired, or wireless network, or any combination of a dedicated network or a virtual dedicated network). In some embodiments, technologies and/or formats, such as hypertext markup language (HTML) and extensible markup language (XML), are used for representing data exchanged through a network. In addition, all or some links may be encrypted by using conventional encryption technologies such as secure socket layer (SSL), transport layer security (TLS), virtual private network (VPN), and internet protocol security (IPsec). In some other embodiments, custom and/or dedicated data communication technologies may also be used in place of or in addition to the foregoing data communication technologies.

For ease of presentation, the following embodiments are described by using an example in which the face beautification method applied to the terminal 120 in FIG. 1.

The face beautification method provided in the embodiments of this application can be used to beautify a face shape and facial parts, and is applicable to application scenarios including photo retouching and photographing. The following describes the face beautification method in different application scenarios.

Photo Retouching Scenario

When the face beautification method is applied to a photo retouching scenario, the face beautification method can be implemented as a picture processing application, which is installed and run in a terminal. The picture processing application provides a "Reshape all" function entry, and provides several reference face templates for a user to select.

Figure 2:
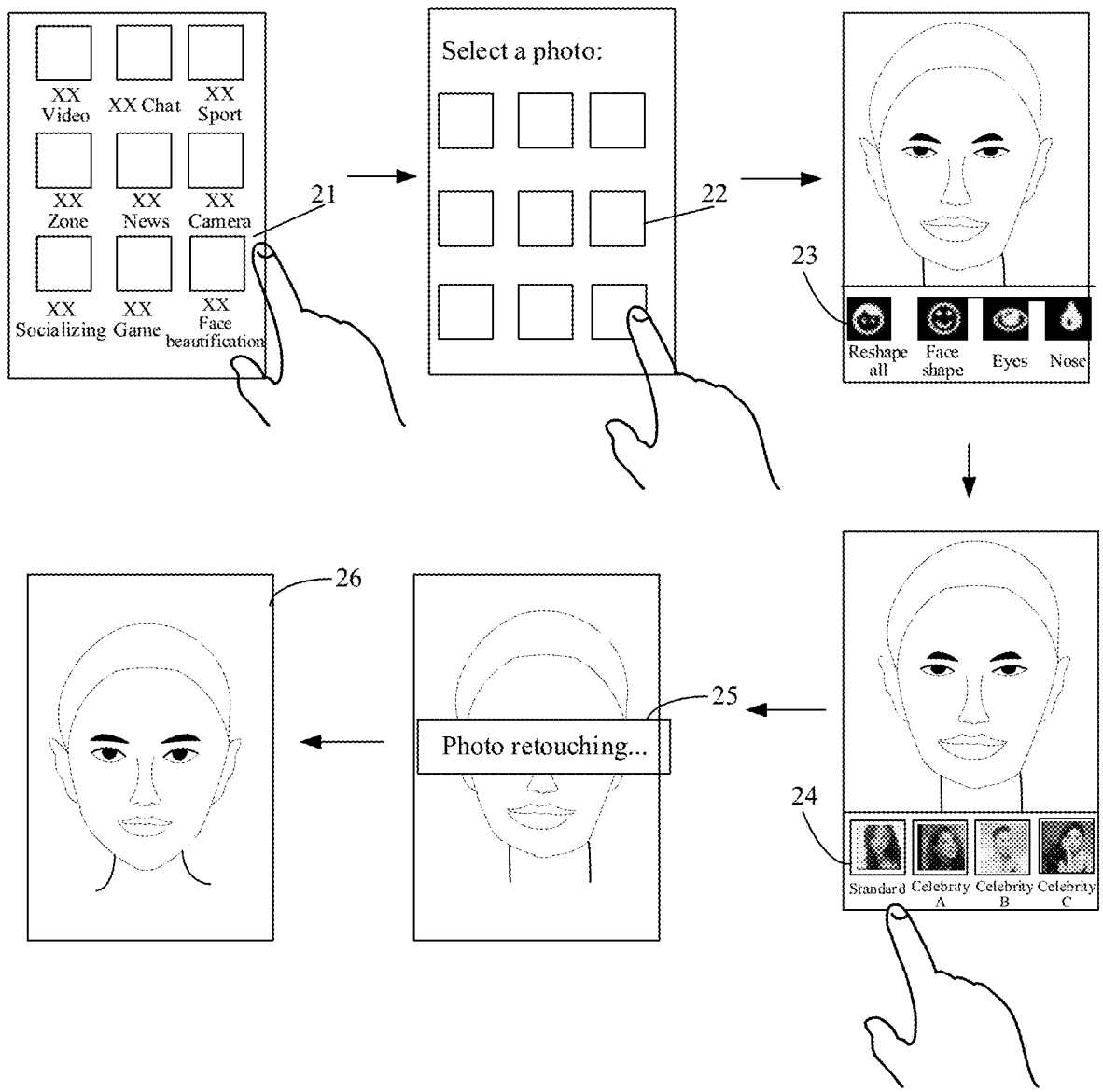
FIG. 2 shows a schematic diagram of implementation of a face beautification process in a photo retouching scenario according to an embodiment of this application.

As shown in FIG. 2, after the user clicks an application icon 21 corresponding to the picture processing application, the terminal starts the picture processing application. Before retouching a picture, the user first selects a to-be-beautified picture 22 from an album. After the picture is selected, the picture processing application provides several beautification function entries for the user to select. After the user clicks on a "Reshape all" function entry 23, the picture processing application further displays several reference face templates for the user to select. After the user selects a "standard" reference face template 24, the picture processing application beautifies a face in the to-be-beautified picture according to face parameters corresponding to the reference face template 24 and face parameters of the face in the to-be-beautified picture, to make the ratios of a contour and facial parts of the beautified face approach those of the reference face template, and displays beautification prompt information 25 during the beautification process. After the beautification ends, the picture processing application program displays a beautified picture 26 and provides a save entry for the user to save the beautified picture.

Photographing Scenario

When the face beautification method is applied to a photographing scenario, the face beautification method can be implemented as a camera application, which is installed and run in a terminal. The camera application provides a "Reshape all" function entry, and provides several reference face templates for the user to select.

Figure 3:
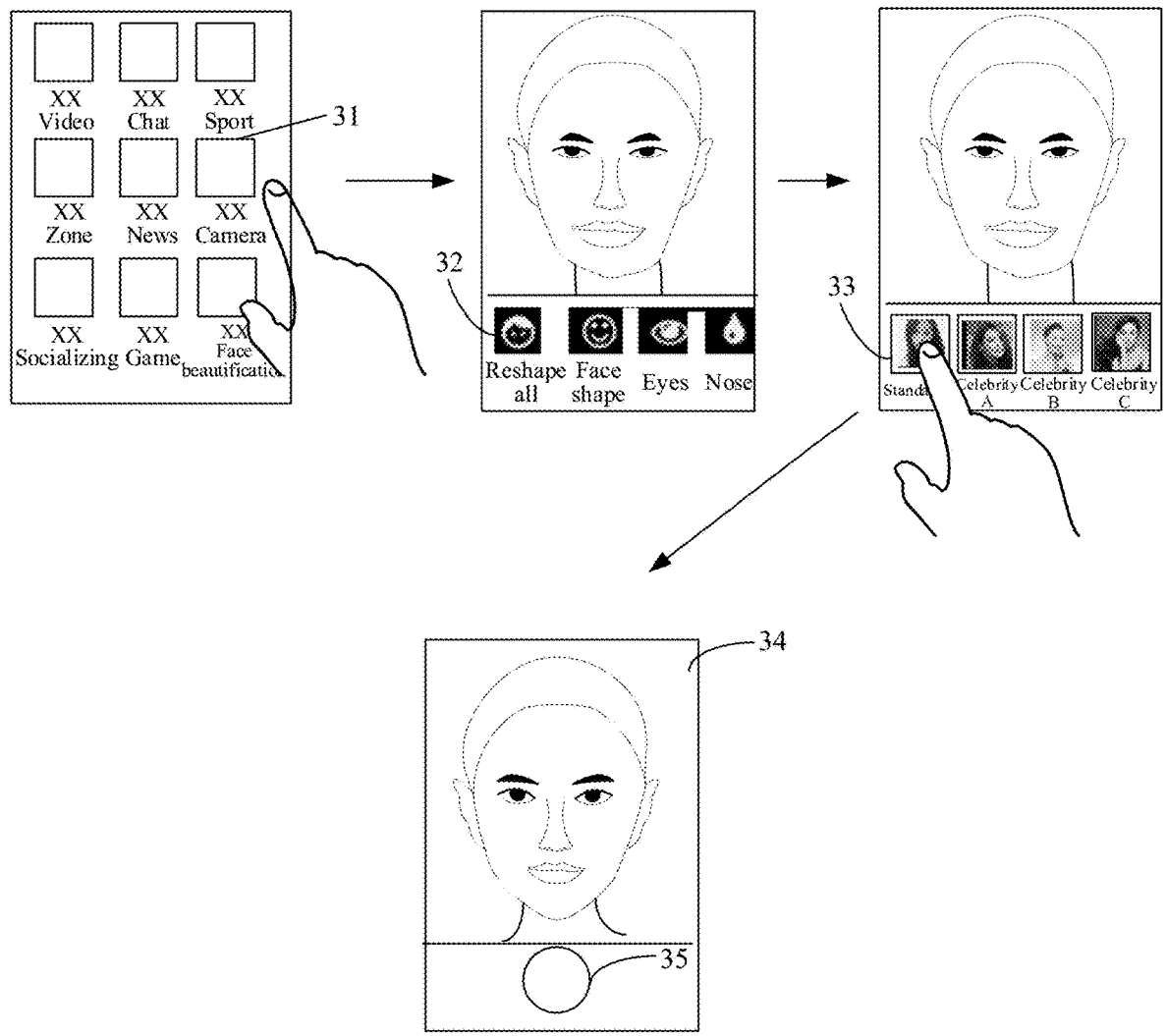
FIG. 3 shows a schematic diagram of implementation of a face beautification process in a photographing scenario according to an embodiment of this application.

As shown in FIG. 3, after the user clicks an application icon 31 corresponding to the camera application, the terminal starts the camera application. Before photographing, the user first selects a "Reshape all" function entry 32 from several beautification function entries provided by the picture processing application, and then further selects a "standard" reference face template 33 from the several reference face templates displayed by the picture processing application. The camera processing application beautifies a face in a viewfinder screen according to face parameters corresponding to the reference face template 33 and face parameters of the face in a viewfinder screen, and displays a beautified face image 34 in the viewfinder screen in real time. Then the user can complete the photographing by clicking a photographing control 34.

Certainly, in addition to the foregoing scenarios, the face beautification method can also be applied to other scenarios that involve beautifying a face in an image, and a specific application scenario is not limited in the embodiments of this application.

Figure 4:
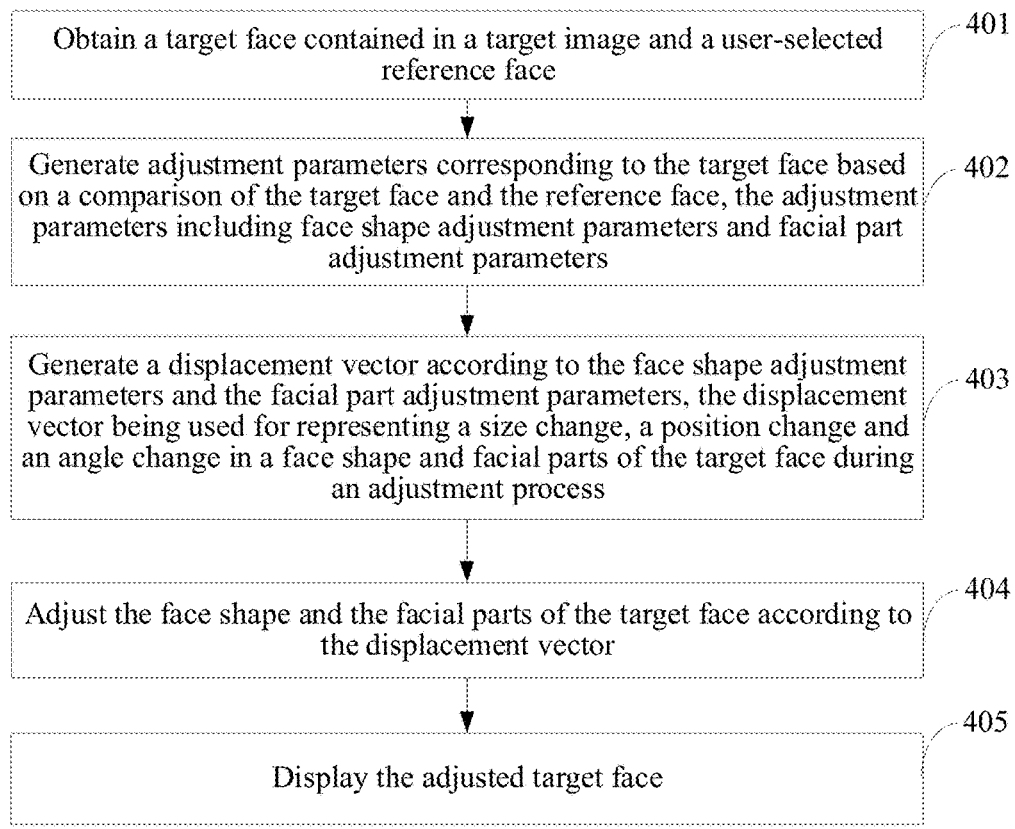
FIG. 4 shows a flowchart of a face beautification method according to an embodiment of this application.
Figure 5:
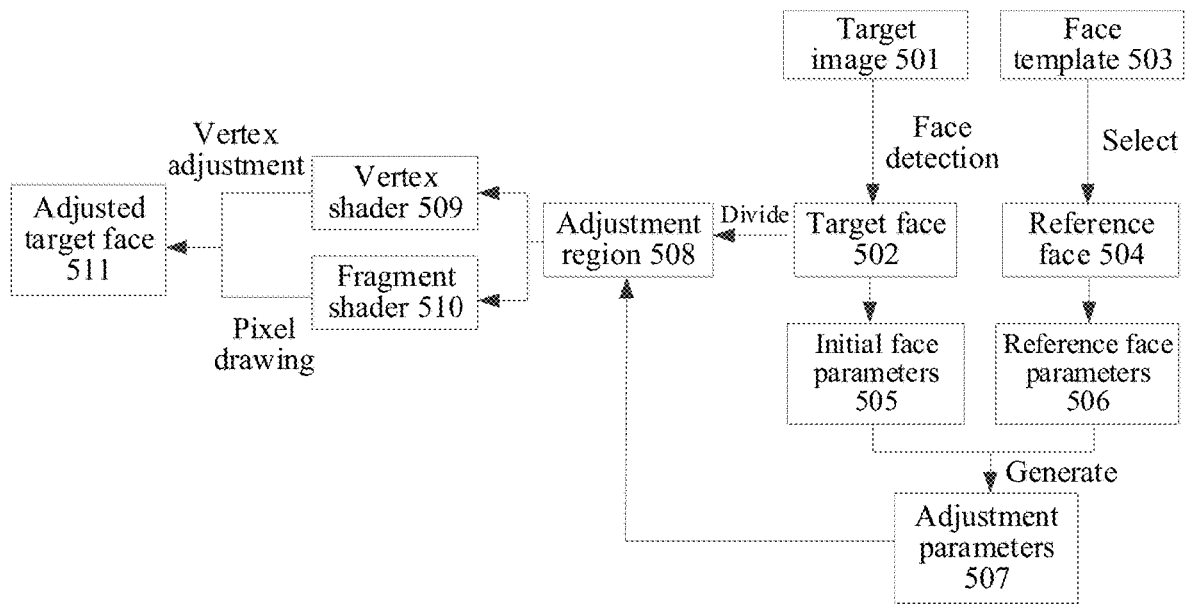
FIG. 5 shows a schematic diagram of a principle of a face beautification method according to an embodiment of this application.

FIG. 4 shows a flowchart of a face beautification method according to an embodiment of this application. This embodiment is described by using an example in which the method is applied to the terminal 120 in FIG. 1. The method may further include the following steps.

Step 401: Obtain a target face contained in a target image and a user-selected reference face.

Optionally, the target image is a picture, or the target image is an image displayed in a viewfinder screen.

For example, when the method is applied to a picture processing application installed in a terminal, the target image is an imported picture; and when the method is applied to a camera application installed in a terminal, the target image is an image displayed in a viewfinder screen in real time.

Optionally, after obtaining the target image, the terminal performs face detection on the target image. If a face in the target image is detected, the face in the target image is extracted as a target face, and step 402 is performed; if no face in the target image is detected, a prompt message is displayed, prompting the user that no face cannot be detected.

Optionally, the target face included in the target image may be a front-view face (that is, a frontal face), or a face of any angle (that is, a side face).

Step 402: Generate adjustment parameters corresponding to the target face based on a comparison of the target face and the reference face, the adjustment parameters including face shape adjustment parameters and facial part adjustment parameters.

The adjustment parameters are used to indicate that the target face is adjusted based on the reference face.

Optionally, the reference face is a face template selected by the terminal from several face templates, and having a relatively high similarity with the target face, or the reference face is a face template manually selected by the user from several face templates.

The reference face is a virtual face constructed according to standard face contour and facial parts ratios, or the reference face is a face of a public figure.

In a possible implementation, according to face parameters of the target face and face parameters of the reference face, the terminal generates adjustment parameters corresponding to the target face, and the adjustment parameters include face shape adjustment parameters used for adjusting the face shape of the target face, and/or facial part adjustment parameters used for adjusting the facial parts of the target face.

Optionally, the face shape adjustment parameters may include at least one of a face width zooming ratio, a V-line angle adjustment amount, a chin height adjustment amount, and a forehead height adjustment amount; and the facial part adjustment parameters may include at least one of a facial part zooming ratio, a facial part position offset amount, and a facial part angle adjustment amount.

Step 403: Generate a displacement vector according to the face shape adjustment parameters and the facial part adjustment parameters, the displacement vector being used for representing a size change, a position change and an angle change in a face shape and facial parts of the target face during an adjustment process.

To achieve the effect of "Reshape all" and avoid a poor face beautification effect resulted from mutual influence between different facial portions during reshaping performed on them, in this embodiment of this application, after the terminal generates the adjustment parameters, instead of directly adjusting the target face according to the adjustment parameters, the terminal generates a displacement vector of the face shape and facial parts of the target face for each adjustment according to the adjustment parameters, and then adjusts sizes, positions, and angles of the face shape and the facial parts according to the displacement vector.

Optionally, the displacement vector is generated by a vertex shader according to the adjustment parameters.

Step 404: Adjust the face shape and the facial parts of the target face according to the displacement vector.

In a possible implementation, the terminal simultaneously adjusts the face shape and the facial parts of the target face according to the displacement vector, or the terminal adjusts the face shape and facial parts of the target face according to a preset adjustment sequence based on the displacement vector.

Optionally, the terminal adjusts the target face by using a vertex shader and a fragment shader according to the displacement vector.

Optionally, adjustment methods for adjusting the face shape include size adjustment and angle adjustment. The size adjustment includes adjusting a face aspect ratio, a chin height, and a forehead height of the target face; the angle adjustment includes adjusting a V-line angle of the target face.

Optionally, adjustment methods for adjusting the facial parts include size adjustment, angle adjustment, and position adjustment. The size adjustment includes adjusting ratios of the facial parts, the angle adjustment includes adjusting a tilt angle of the facial parts, and the position adjustment includes adjusting positions of the facial parts on the face.

Unlike the related art, where different faces are beautified according to a uniform beautification policy, in the embodiments of this application, the terminal generates the adjustment parameters corresponding to the target face by analyzing a difference between the target face and the reference face, and adjusts the target face based on the adjustment parameters to be in a close resemblance to the reference face, thereby ensuring that ratios of the face shape and the facial parts of the adjusted target face meet the standard, and improving a face beautification effect.

Optionally, to facilitate the user to observe the effect of dynamic adjustment in real time, during the adjustment of the target face, the dynamic change process of the contour and the facial parts of the target face may be displayed on a display interface.

Step 405: Display the adjusted target face.

After the adjustment ends, the terminal displays the adjusted target face. Optionally, the terminal simultaneously displays the target face before the adjustment and the target face after the adjustment, so that the user can learn differences of the face shape and the facial parts before and after the adjustment. In summary, in this embodiment of this application, after a target face contained in a target image is obtained, adjustment parameters corresponding to the target face are generated according to a reference face whose face shape and facial parts all meet a preset standard, and size adjustment, angle adjustment and/or position adjustment is performed on the face shape and facial parts of the target face according to the adjustment parameters, and then the adjusted target face is displayed. In this embodiment of this application, differences of different faces are taken into account, and an adjustment policy that meets features of the target face is formulated according to differences between the target face and the reference face, thereby formulating a beautification policy in a targeted manner, and improving a face beautification effect.

In a possible implementation, after obtaining a target image 501, the terminal performs face detection on the target image 501 and recognizes a target face 502 thereof; and at the same time, the terminal displays several face templates 503 for the user to select, so as to determine a reference face 504 according to a face template selected by the user.

Further, according to initial face parameters 505 corresponding to the target face 502 and reference face parameters 506 corresponding to the reference face 504, the terminal generates adjustment parameters 507 used for face beautification. Before performing face beautification based on the adjustment parameters 507, the terminal divides the target face 502 into several adjustment regions 508. For each adjustment region 508, the terminal adjusts a position of a vertex in the adjustment region 508 according to the adjustment parameters 507 corresponding to the adjustment region 508 by using a vertex shader 509, and redraws pixels in the adjustment regions 508 by using a fragment shader 510, and finally an adjusted target face 511 is obtained. A process of face beautification is described below with an illustrative embodiment.

Figure 6:
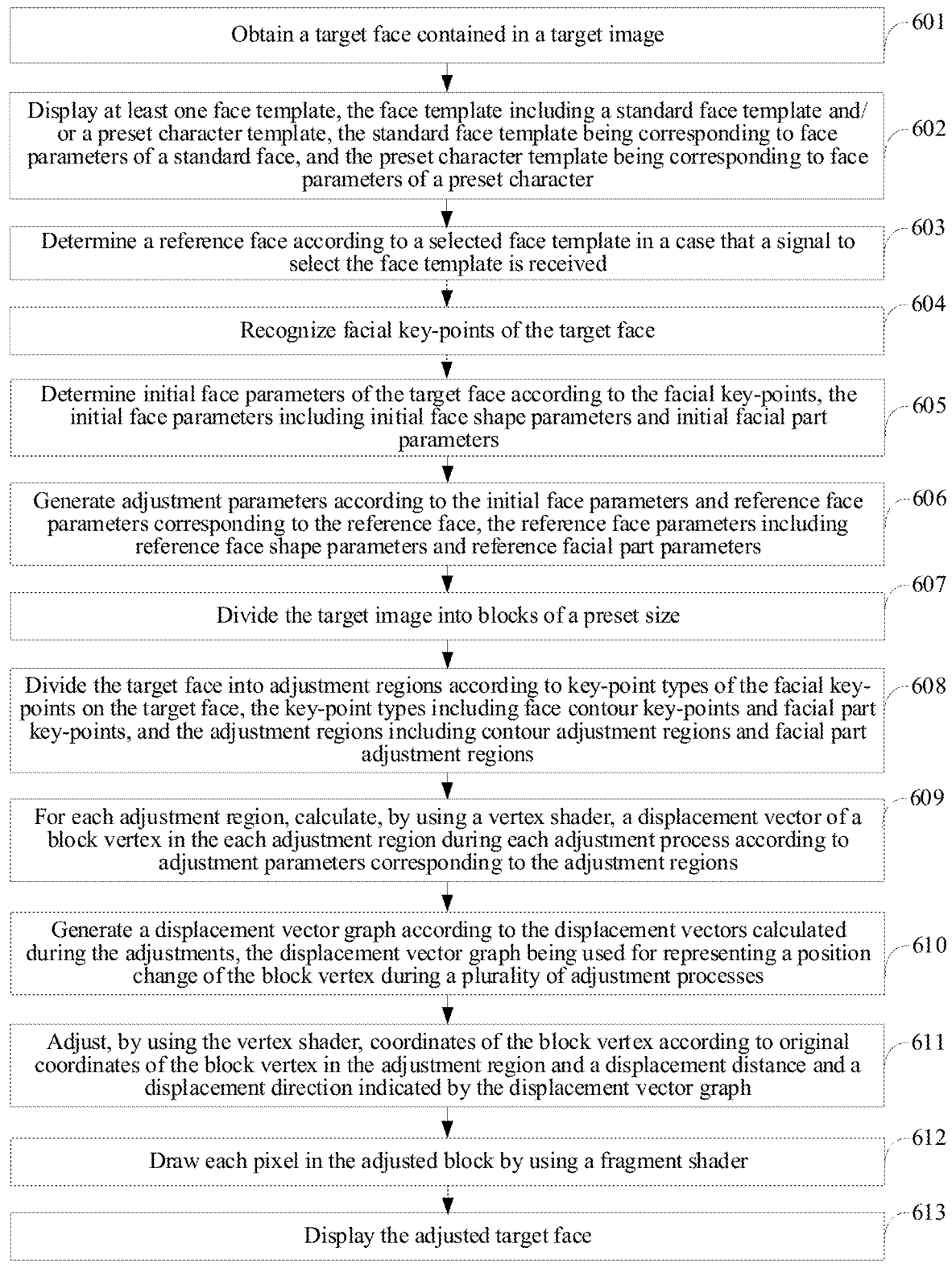
FIG. 6 shows a flowchart of a face beautification method according to another embodiment of this application.

FIG. 6 shows a flowchart of a face beautification method according to another embodiment of this application. This embodiment is described by using an example in which the method is applied to the terminal 120 in FIG. 1. The method may further include the following steps.

Step 601: Obtain a target face contained in a target image.

For the implementation of this step, reference may be made to step 401, and details are not described again in this embodiment.

Step 602: Display at least one face template, the face template including a standard face template and/or a preset character template, the standard face template being corresponding to face parameters of a standard face, and the preset character template being corresponding to face parameters of a preset character.

In a possible implementation, the terminal displays at least one face template for the user to select. The face template may be a built-in template in a beautification application or a template downloaded from a server.

Figure 7:
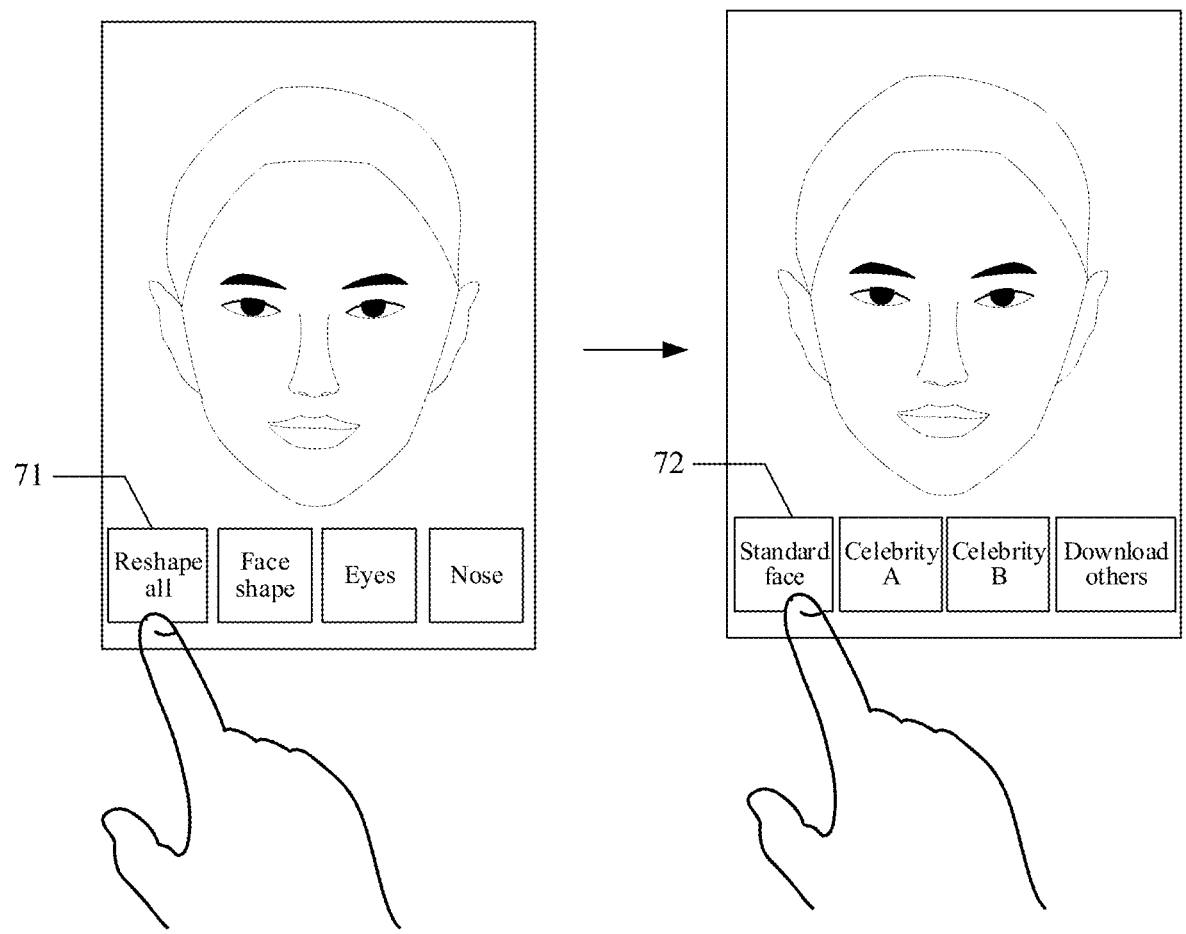
FIG. 7 shows a schematic diagram of an interface in a process of displaying and selecting a face template according to an embodiment of this application.

Illustratively, as shown in FIG. 7, a beautification application running on the terminal provides an "Reshape all" entry 71. When the user clicks on the entry 71, the terminal displays at least one face template option 72 for the user to select.

Optionally, each face template corresponds to respective face parameters, and the face parameters include face shape parameters and facial parts parameters.

When the face template is a standard face template, face parameters corresponding to the face template include face shape parameters and facial part parameters of a standard face (with standards such as the Chinese golden ratio for describing a face); and when the face template is a preset character template, face parameters corresponding to the face template include face shape parameters and facial part parameters based on a preset character (such as a public figure or a celebrity).

For a generation method of a preset character template, in a possible implementation, the server pre-locates facial key-points of a face picture of a preset character, and then calculates face shape parameters and facial part parameters of the preset character according to the facial key-points obtained through locating, thereby generating a preset character template containing the foregoing parameters.

In other possible implementations, the user may upload a personal photo through the terminal, and the server generates a corresponding personal face template according to the personal photo and feeds the personal face template back to the terminal, which is not limited in this embodiment of this application.

Step 603: Determine the reference face according to a selected face template in a case that a signal to select the face template is received.

Illustratively, as shown in FIG. 7, when receiving a signal for selecting a face template 71 of "standard face", the terminal determines the "standard face" as the reference face for the face beautification.

Step 604: Recognize facial key-points of the target face.

To facilitate subsequent quantification of differences of the face shape and the facial parts between the target face and the reference face, after the target image is obtained, the terminal performs face detection on the target image and recognizes facial key-points on the target face.

The terminal can use methods such as a method based on an active shape model (ASM) and an active appearance model (AAM), a method based on cascaded pose regression (CPR), or a method based on deep learning model to locate facial key-points, and a specific method for face detection is not limited in this application.

Optionally, after the facial key-points are recognized, the terminal may detect each facial portion based on the facial key-points. For example, the facial portions such as the left eye, the right eye, the nose, the left eyebrow, the right eyebrow, the chin, and the mouth in the target face may be detected, to obtain regions at which the facial portions are located. For example, a region at which the left eyebrow is located can be determined according to 8 facial key-points of the left eyebrow, and a region at which the nose is located can be determined according to 14 facial key-points of the nose.

Figure 8:
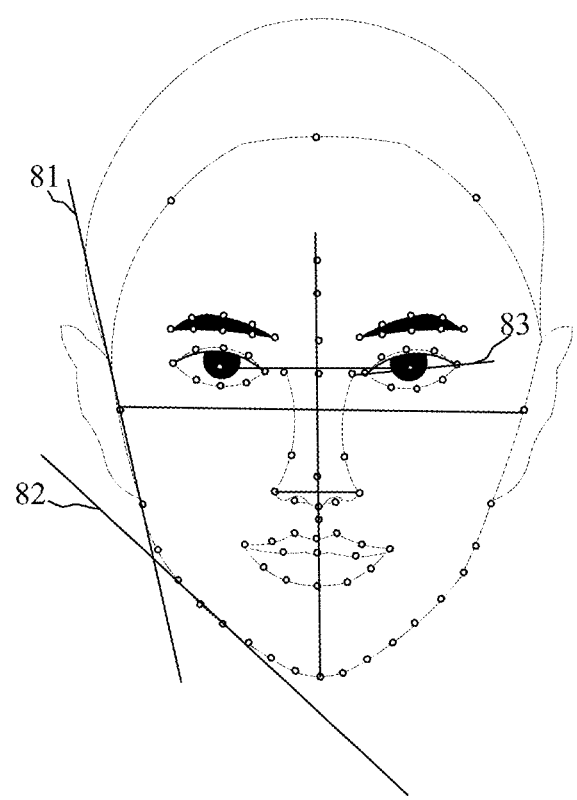
FIG. 8 shows a schematic diagram of facial key-points on a target face according to an embodiment of this application.

Optionally, to improve the subsequent beautification effect, the terminal recognizes 83 or 90 facial key-points on the target face. Illustratively, the distribution of facial key-points on the target face is shown in FIG. 8.

In other possible implementations, when it is necessary to beautify a designated face in an image, after facial key-points are located, the terminal compares the facial key-points obtained through locating with the facial key-points of the designated face, thereby calculating a face similarity between each face in the image with the designated face, and determining a face corresponding to a highest face similarity as a to-be-beautified face. Then the terminal only beautifies the designated face in the image, and does not beautify other faces.

Step 605: Determine initial face parameters of the target face according to the facial key-points, the initial face parameters including initial face shape parameters and initial facial part parameters.

In a possible implementation, the terminal obtains key-point types corresponding to the facial key-points, determines the initial face shape parameters according to face contour key-points, and determines the initial facial part parameters according to facial part key-points. The face contour key-points include at least one of cheek key-points, chin key-points, and forehead key-points. The facial part key-points include at least one of eye key-points, eyebrow key-points, nose key-points, and mouth key-points.

Correspondingly, the initial face shape parameters determined by the terminal according to the face contour key-points include at least one of an initial face aspect ratio, an initial chin height, and an initial V-line angle; and the initial facial part parameters determined according to the facial part key-points include at least one of initial facial part ratios, initial facial part positions, and initial facial part angles. The initial face parameters may be represented by a ratio (for example, a quarter of a face width), or a numerical value (for example, 100 px).

In a possible implementation, when the initial face parameters and the reference face parameters are both represented by ratios, the terminal can directly determine the initial face parameters according to the recognized facial key-points. When some parameters in the initial face parameters and the reference face parameters are represented by numerical values, after recognizing the facial key-points, the terminal needs to crop a facial region out of the target image based on a face width (the size is larger than the face width, for example, three times the face width), convert the facial region and the reference face to the same coordinate space, and then determine the initial face parameters of the target face, so as to avoid adjustment deviations caused by different coordinate spaces.

Optionally, initial face aspect ratio=face width/face height, where the face width is a distance between a left face contour key-point and a right face contour key-point, and the face height is a distance between an upper face contour key-point and a lower face contour key-point.

Optionally, the initial V-line angle is an included angle formed by a tangent line to a cheek and a tangent line to a chin. As shown in FIG. 8, the terminal determines a tangent line 81 to a cheek according to cheek key-points, and determines a tangent line 82 to a chin according to chin key-points, so as to determine the initial V-line angle according to the angle formed by the tangent line 81 to the cheek and the tangent line 82 to the chin.

Optionally, the initial facial part ratios include an initial facial part height ratio and an initial facial part width ratio. Initial facial part height ratio=facial part height/face height, and initial facial part width ratio=facial part width/face width. The initial facial part ratios also include an initial eye distance ratio, and the initial eye distance ratio is a ratio of a distance between pupils of the eyes to the face width.

Optionally, the initial facial part positions include initial facial part lateral positions and initial facial part longitudinal positions, where the initial facial part lateral positions are positions of facial parts in a width direction of a face, and the initial facial part longitudinal positions are positions of facial parts in a height direction of a face. The initial facial part lateral positions and the initial facial part longitudinal positions can be expressed by ratios (for example, located at one-quarter of the face height, or one-half of the face width).

Optionally, the initial facial part angles include initial eyebrow angles and initial eye angles, where the initial eyebrow angle is an included angle between a line of eyebrow corners and the horizontal direction, and the initial eye angle is an included angle between a line of the eye corners and the horizontal direction. As shown in FIG. 8, the initial eye angle of the left eye is an included angle between a line 83 of the left eye corners and the horizontal direction.

This embodiment uses only the initial face parameters as an example for schematic description, and other parameters used for describing a face shape and facial part features can all be used as initial face parameters, and this application does not constitute a limitation on this.

Step 606: Generate the adjustment parameters according to the initial face parameters and reference face parameters corresponding to the reference face, the reference face parameters including reference face shape parameters and reference facial part parameters.

Because the target face needs to be adjusted subsequently based on the reference face, the terminal generates, based on the initial face parameters and the reference face parameters corresponding to the reference face, adjustment parameters that indicate differences between the target face and the reference face, where the reference face parameters have the same parameter types as the initial face parameters.

In a possible implementation, the following methods may be used when the terminal generates the adjustment parameters.

First, a face width zooming ratio in the adjustment parameters is determined according to an initial face aspect ratio in the initial face shape parameters and a reference face aspect ratio in the reference face shape parameters.

Optionally, face width zooming ratio=reference face aspect ratio/initial face aspect ratio, then the terminal adjusts the face width of the target face according to the face width zooming ratio while keeping the face height unchanged.

For example, when a reference face aspect ratio is 0.618, and an initial face aspect ratio is 0.6 (the face is relatively thin and long), the terminal calculates the face width zooming ratio: 1.03. That is, the face width needs to be zoomed in by 1.03 times.

After the target face is adjusted based on the face width zooming ratio, the aspect ratio of the target face approaches the aspect ratio of the reference face, avoiding the problem that the beautified face is excessively fat or excessively thin.

Second, a V-line angle adjustment amount in the adjustment parameters is determined according to an initial V-line angle in the initial face shape parameters and a reference V-line angle in the reference face shape parameters, the V-line angle being an included angle formed by a tangent line to a cheek and a tangent line to a chin.

Optionally, V-line angle adjustment amount=reference V-line angle−initial V-line angle. Then the terminal adjusts the cheek or chin of the target face according to the V-line angle adjustment amount, so that the V-line angle of the beautified face approaches the V-line angle of the reference face.

Third, a chin height adjustment amount in the adjustment parameters is determined according to an initial chin height in the initial face shape parameters and a reference chin height in the reference face shape parameters.

Optionally, when the chin height is expressed by a length, chin height adjustment amount=reference chin height−initial chin height. Then the terminal adjusts the chin height of the target face according to the chin height adjustment amount, so that the chin height of the beautified face approaches the chin height of the reference face.

In other possible implementations, when the chin height is represented by a ratio, chin height adjustment amount=reference chin height/initial chin height. Then the terminal calculates a chin height offset amount according to the face height and the chin height adjustment amount.

Fourth, facial part zooming ratios in the adjustment parameters are determined according to initial facial part ratios in the initial facial part parameters and reference facial part ratios in the reference facial part parameters, the facial part ratios including a ratio of a facial part height to a face height and a ratio of a facial part width to a face width.

Optionally, facial part zooming ratio=initial facial part ratio/reference facial part ratio. When the initial facial part ratio is the initial facial part height ratio, the reference facial part ratio is the reference facial part height ratio; and when the initial facial part ratio is the initial facial part width ratio, the reference facial part ratio is the reference facial part width ratio.

For example, when a target eye width ratio of the reference face meets a standard of the Chinese golden ratio for describing a face, that is, the eye width is ⅕ of the face width, if an initial eye width ratio is 1/5.5 (a relatively small eye width), the terminal calculates an eye width zooming ratio: 1.1. That is, the eye width of the target face needs to be zoomed in by 1.1 times.

After the heights and widths of the initial facial parts are adjusted based on the facial part zooming ratio, the ratios of the initial facial part widths and the initial facial part heights on the face approach those of reference face, thereby achieving the effect of optimizing the facial part ratios.

Fifth, facial part position offset amounts in the adjustment parameters are determined according to initial facial part positions in the initial facial part parameters and reference facial part positions in the reference facial part parameters.

Optionally, facial part position offset amount=reference facial part position−initial facial part position, where the facial part position offset amounts includes facial part longitudinal offset amounts and facial part lateral offset amounts. Then, based on the initial facial part positions, the terminal adjusts the longitudinal and lateral positions of the facial parts in the face according to the facial part position offset amounts.

Sixth, facial part angle adjustment amounts in the adjustment parameters are determined according to initial facial part angles in the initial facial part parameters and reference facial part angles in the reference facial part parameters.

Optionally, facial part angle adjustment amount=reference facial part angle−initial facial part angle, or facial part angle adjustment amount=initial facial part angle/reference facial part angle. Then the terminal adjusts the facial part angles of the target face according to the facial part adjustment amounts, so that the facial part angles of the beautified face approach the facial part angles of the reference face.

For example, when a target eye angle is 10° and an initial eye angle is 9°, the terminal calculates the eye angle adjustment amount: 1°.

This embodiment uses only the generation of the adjustment parameters as an example for description, and other parameters used for adjusting a facial shape and facial part features can be used as adjustment parameters, and this application does not constitute a limitation on this.

After the corresponding adjustment parameters of the face shape and the facial parts are generated through the above steps, the terminal makes further adjustment based on the target face through the following steps 607 to 612.

Step 607: Divide the target image into blocks of a preset size.

In an embodiment of this application, the terminal adjusts the target face in the unit of blocks. Therefore, before adjusting the target face, the terminal first divides the target image into rectangular blocks of a preset size. A smaller block size indicates finer face adjustment, and accordingly indicates a better face adjustment effect.

For example, the terminal divides the target image into 50×66 blocks. That is, the width of each block is 1/50 of the width of the target image, and the height of each block is 1/66 of the height of the target image.

Illustratively, as shown in FIG. 9, the terminal divides a target image 91 into several blocks.

Step 608: Divide the target face into adjustment regions according to key-point types of the facial key-points on the target face, the key-point types including face contour key-points and facial part key-points, and the adjustment regions including contour adjustment regions and facial part adjustment regions.

Since it is necessary to adjust a face contour and the facial parts separately, the terminal first obtains contour adjustment regions through division according to the face contour key-points in the facial key-points, and obtains facial part adjustment regions through division according to the facial part key-points in the facial key-points. That is, the contour adjustment regions obtained through division include the face contour key-points, and the facial part adjustment regions obtained through division include the facial part key-points.

In a possible implementation, as shown in FIG. 10, this step may include the following steps.

Step 608A: Divide the target face into facial regions according to the key-point types of the facial key-points, the facial regions including contour regions and facial part regions.

The terminal obtains the contour regions through division according to the face contour key-points, and obtains the facial part regions through division according to the facial part key-points, where the contour regions include a chin region, cheek regions, and a forehead region; and the facial part regions include eye regions, a nose region, eyebrow regions, and a mouth region.

Optionally, a facial region obtained through division is a region that has a smallest area and contains corresponding facial key-points. For example, the eye region is a smallest region that contains all eye key-points.

Optionally, the contour regions and the facial part regions that are obtained through division are both elliptical regions.

Illustratively, as shown in FIG. 9, using the eyes in a face as an example, the terminal obtains an elliptical eye region 92 through division according to eye key-points in facial key-points.

Step 608B: Determine an adjustment region corresponding to each facial region, an area of the adjustment region being larger than an area of the facial region, and the facial region being located inside the adjustment region.

If only the contour regions and the facial part regions that are obtained through division are adjusted, the adjustment effect is not natural enough. Therefore, to achieve a more natural adjustment effect, the terminal determines a corresponding adjustment region based on the facial region.

In a possible implementation, based on the facial region, the terminal stretches a region boundary around the facial region (with a preset stretch amount), so as to obtain the corresponding adjustment region.

Illustratively, as shown in FIG. 9, the terminal stretches a region boundary of the eye region 92 to obtain an elliptical eye adjustment region 93.

Certainly, the terminal may also use other methods to determine the adjustment region corresponding to the facial region, which is not limited in this embodiment of this application.

Step 609: For each adjustment region, calculate, by using a vertex shader, a displacement vector of a block vertex in the adjustment region during each adjustment process according to adjustment parameters corresponding to the adjustment regions.

After the blocks are obtained through division and the adjustment regions are determined, the process of adjusting a to-be-optimized face is a process of adjusting coordinates of block vertices in the adjustment regions.

The adjustment of the block vertices may need to be performed for a plurality of times. For example, block vertices in the eye adjustment regions, the nose adjustment region, and the mouth adjustment region need to be adjusted separately. Therefore, in a possible implementation, each time the terminal completes a block vertex adjustment, the terminal performs pixel rendering based on the adjusted block vertices to obtain an intermediate image, and uses the intermediate image as an input for the next block vertex adjustment.

Figure 11:
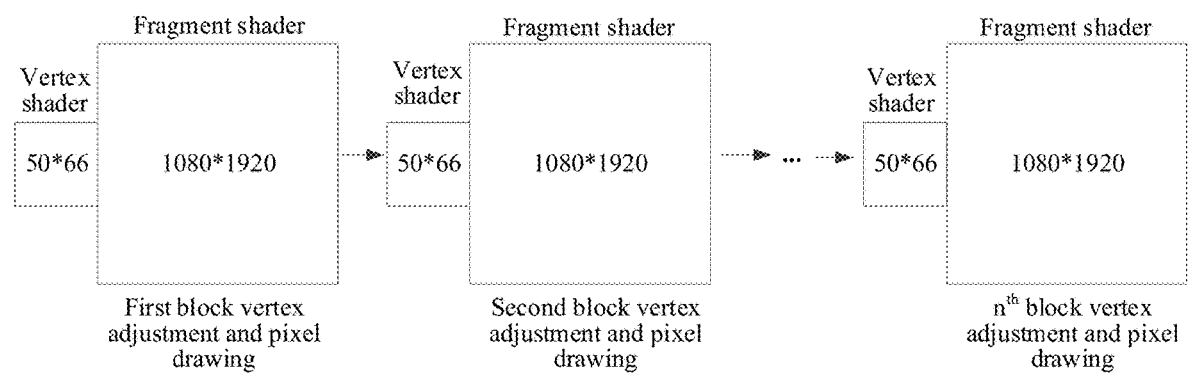
FIG. 11 shows a schematic diagram of a principle of a process of adjusting a block vertex and redrawing pixels according to an embodiment of this application.

Illustratively, as shown in FIG. 11, for a 1080*1920 target image, if the target image is divided into 50*66 blocks, each time block vertices of the 50*66 blocks are adjusted, the terminal draws 1080*1920 pixels to obtain an intermediate image, and the intermediate image is used as an input for the next adjustment. Finally, after n times of block vertex adjustments and pixel drawing, the terminal obtains the beautified target image.

However, when the foregoing method is used for rendering, an intermediate image needs to be rendered after each block vertex adjustment, and a resolution of the intermediate image is relatively large, resulting in a relatively low rendering speed, relatively high requirements of rendering performance of the terminal, and a high probability of occurrence a frozen screen.

In addition, when there is an intersection between different adjustment regions, the adjustment sequence of the adjustment regions affects the final adjustment effect when this method is used for adjustment. For example, there is an intersection between an eye adjustment region and an eyebrow adjustment region in the target image, and there are block vertices in the intersection region. If the eye adjustment region is adjusted first, the block vertices in the intersection region may move out of the eyebrow adjustment region after the adjustment, resulting in failure to adjust the block vertices in the initial intersection region when the eyebrow adjustment region is adjusted subsequently.

To improve the rendering efficiency and avoid the influence of an adjustment time sequence on the adjustment effect, in a possible implementation, each time coordinates of the block vertices are adjusted according to the adjustment parameters, the vertex shader calculates a displacement vector of each block vertex in the adjustment region (that is, offset information of the block vertex), and store the displacement vector in an output result of the fragment shader as an input for the next adjustment of the coordinates of the block vertex.

In other words, each time the terminal adjusts the block vertex by using the vertex shader, the terminal does not directly render a full-resolution intermediate image by using the vertex shader, thereby reducing an amount of rendering during each adjustment and improving the rendering efficiency; moreover, the vertex shader does not directly adjust the block vertex according to the displacement vector, therefore, the adjustment time sequence of the adjustment region does not affect the final adjustment effect.

Figure 12:
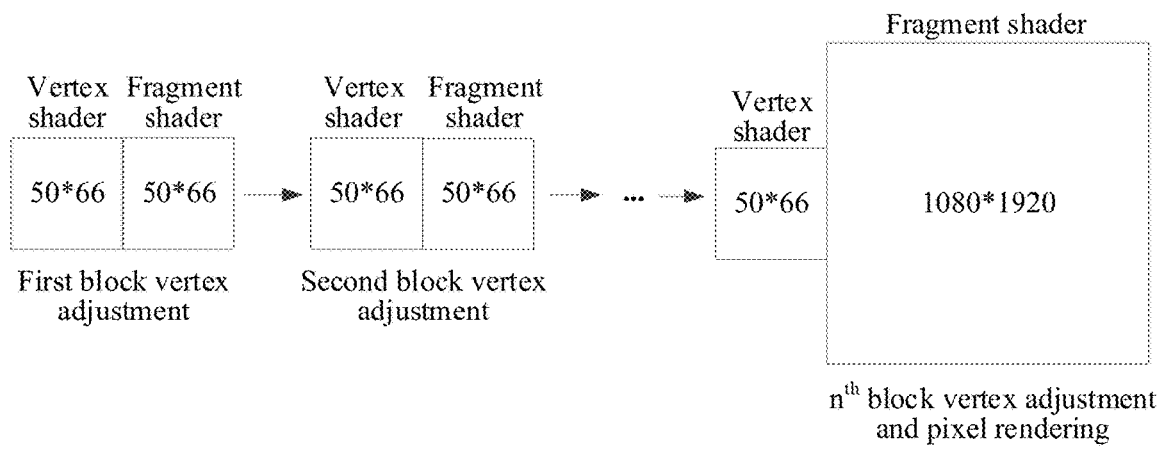
FIG. 12 shows a schematic diagram of a principle of a process of adjusting a block vertex and redrawing pixels according to another embodiment of this application.

Illustratively, as shown in FIG. 12, for a 1080*1920 target image, if the target image is divided into 50*66 blocks, each time block vertices of the 50*66 blocks are adjusted by using a vertex shader, the vertex shader stores displacement vectors of the block vertices in a fragment shader, and uses initial coordinates of the block vertices as an input for the next adjustment.

Step 610: Generate a displacement vector graph according to the displacement vectors calculated during the adjustments, the displacement vector graph being used for representing a position change of the block vertex during a plurality of adjustment processes.

In a possible implementation, after the last block vertex coordinate adjustment is completed, the terminal accumulates the displacement vectors obtained after the previous block vertex coordinate adjustments to generate a displacement vector graph of the block vertices.

Illustratively, as shown in FIG. 12, the terminal accumulates displacement vectors obtained from the first to nth of block vertex adjustment to generate a displacement vector graph of the block vertices in 50*66 blocks.

Step 611: Adjust, by using the vertex shader, coordinates of the block vertex according to original coordinates of the block vertex in the adjustment region and a displacement distance and a displacement direction indicated by the displacement vector graph.

Further, based on the generated displacement vector graph, the terminal adjusts coordinates of each block vertex by using the vertex shader. Then the terminal redraws the pixels in the adjusted blocks by using the fragment shader to complete the beautification of the facial parts.

In a possible implementation, for any block vertex, the terminal obtains a displacement vector corresponding to the block vertex from the displacement vector graph, to determine a displacement direction and a displacement distance that correspond to the block vertex, and then based on original coordinates of the block vertex, adjusts the coordinates of the block vertex according to the displacement direction and the displacement distance.

Illustratively, as shown in FIG. 9, for the determined eye adjustment region 93, the terminal first determines block vertices (a hollow circle in FIG. 9) in the eye adjustment region 93. Then, according to the displacement vector graph, the terminal determines that a displacement direction of block vertices in the left region of the eye adjustment region 93 is to the left, and a displacement distance thereof is 10 px; and a displacement direction of block vertices in the right region of the eye adjustment region 93 is to the right, and a displacement distance thereof is 10 px. Therefore, horizontal coordinates of the block vertices in the left region are decreased by 10 px, and horizontal coordinates of the block vertices in the right region are increased by 10 px.

Step 612: Draw each pixel in the adjusted block by using a fragment shader.

After the block vertices in each adjustment region are adjusted through step 611, the terminal further redraws each pixel in the adjusted block by using the fragment shader.

Figure 13:
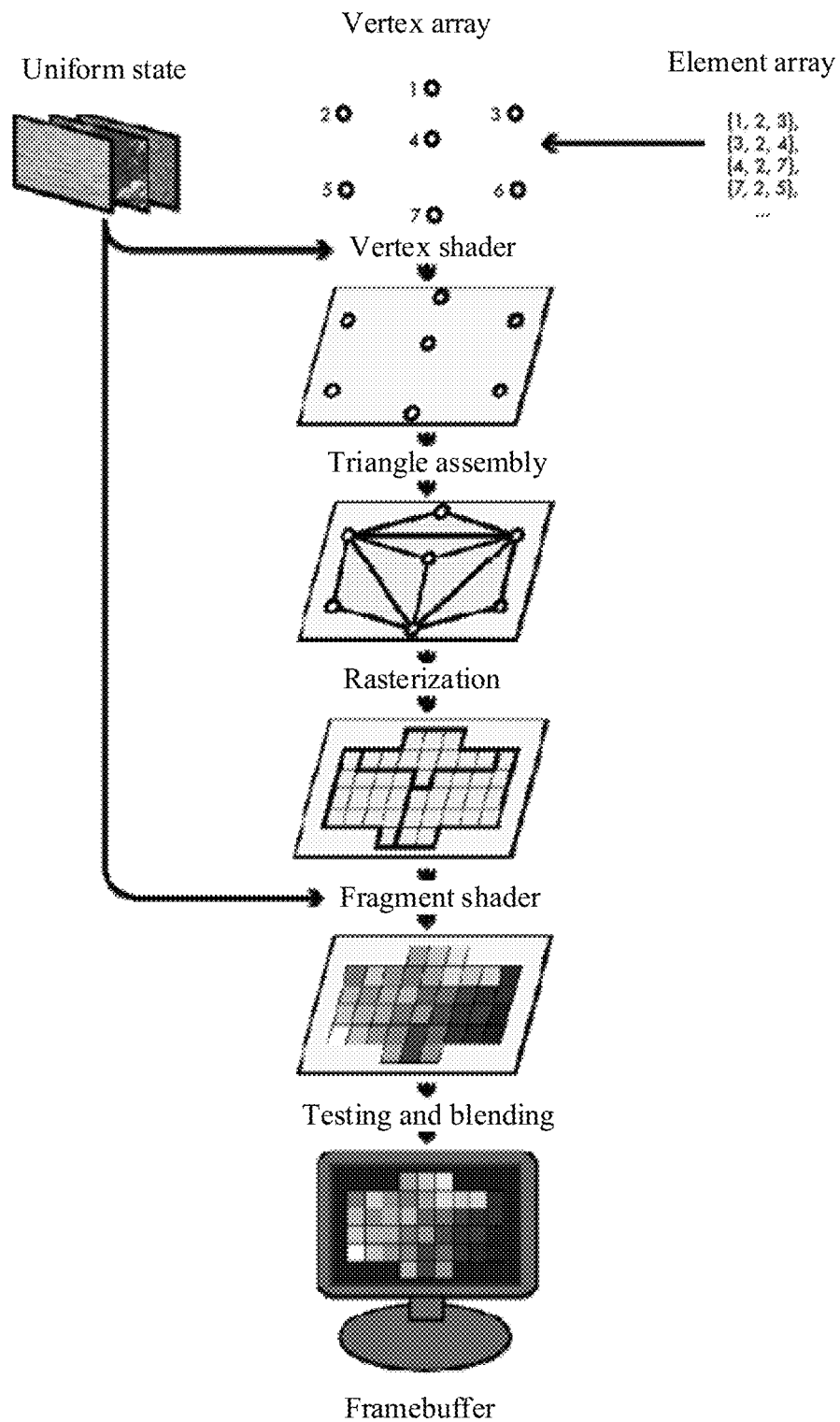
FIG. 13 shows a schematic diagram of implementation of a rendering process of an image rendering pipeline according to an embodiment of this application.

As shown in FIG. 13, an image rendering pipeline for image rendering is applied to a deformation scenario, and a simple and intuitive representation is moving positions of the pixels. The method may be: an image is first divided into a plurality of block regions, then a loaded vertex array of a block region is used as an input to be transmitted to a vertex shader. In the vertex shader, vertex positions of the block region are modified according to a shape into which the block region needs to be deformed. In a process of using the rendering pipeline, the vertex shader is responsible for determining the vertex positions, coordinates of the vertices of the block region may be adjusted according to a deformation rule (that is, deformation parameters of each deformation unit) in the vertex shader, and a fragment shader is responsible for drawing each pixel. Differences between pixels inside each block region and the coordinates of the vertices are calculated. Finally, the modified coordinates of the block vertex positions are transformed into a screen coordinate system (that is, projected onto a screen for display).

In a possible implementation, since the shape of the block is changed after the block vertices are adjusted, the fragment shader deforms initial pixels in each block by an interpolation algorithm to deform the face shape and the facial parts. The interpolation process is automatically completed by an open graphics library (OpenGL), and nearest neighbor interpolation, bilinear interpolation, pixel region relation resampling, bicubic interpolation or another interpolation method may be used.

Illustratively, as shown in FIG. 9, after the terminal adjusts the coordinates of the block vertices in the eye adjustment region 93 by using the vertex shader, the terminal further redraws pixels in the eye adjustment region 93 by using the fragment shader, and finally obtains an eye image 94 with a zoomed-in width.

Step 613: Display the adjusted target face.

For the implementation of this step, reference may be made to step 405, and details are not described again in this embodiment.

In this embodiment, the terminal provides a plurality of face templates for the user to select, and uses the face template selected by the user as a reference face to adjust the target face so that the adjusted face meets aesthetic preference of the user.

At the same time, the terminal determines the initial face parameters of the target face based on the recognized facial key-points, so that the adjustment parameters are then generated based on the initial face parameters and the reference face parameters of the reference face, thereby providing quantitative indicators for the subsequent face adjustment, and improving the accuracy of face beautification.

In addition, the terminal divides the target image into several blocks and obtains different adjustment regions through division, so as to adjust and redraw block vertices and pixels in the adjustment regions by using the vertex shader and fragment shader, which improves accuracy of the beautification and makes the beautification effect of the face more natural.

In addition, the terminal adjusts the coordinates of the block vertices by using a displacement vector graph based on the block vertices, which reduces the amount of rendering and improves the rendering efficiency while avoiding the influence of the adjustment time sequence on the final adjustment effect.

Figure 14:
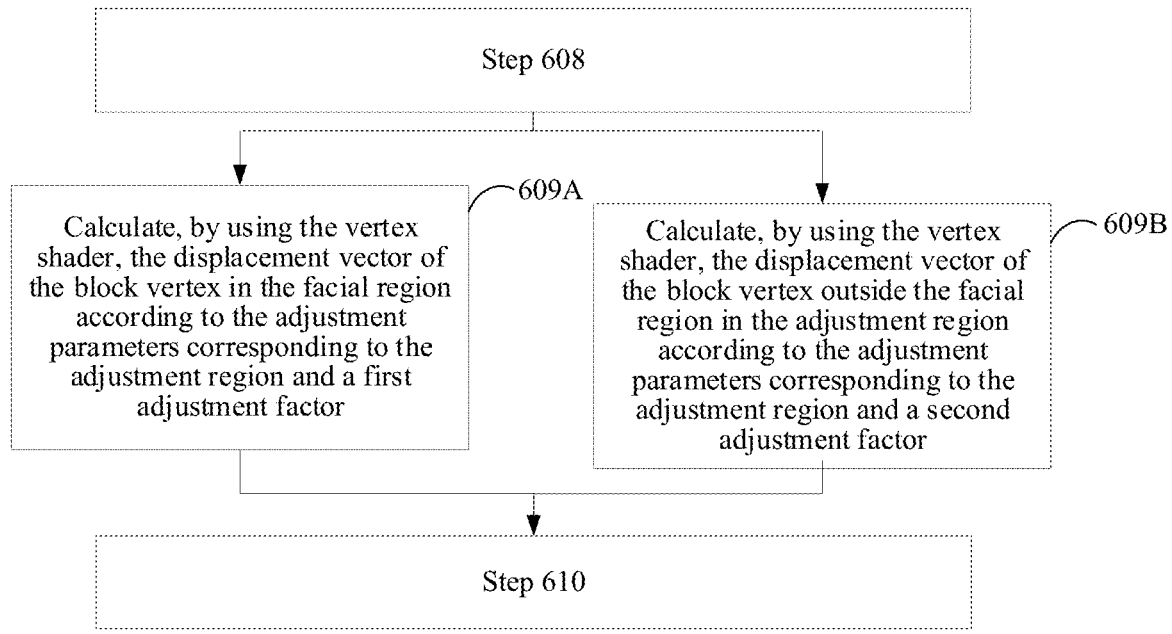
FIG. 14 shows a flowchart of a face beautification method according to another embodiment of this application.

To achieve a more natural beautification effect, based on FIG. 6, as shown in FIG. 14, step 609 may further include the following steps.

Step 609A: Calculate, by using the vertex shader, the displacement vector of the block vertex in the facial region according to the adjustment parameters corresponding to the adjustment region and a first adjustment factor.

In a possible implementation, different subregions in the adjustment region correspond to different adjustment factors, and the adjustment factors have a positive correlation with an adjustment range of coordinates of the block vertex.

Illustratively, as shown in FIG. 9, in the eye adjustment region 93, the eye region 92 corresponds to a first adjustment factor, a region outside the eye region 92 (within the eye adjustment region 93) corresponds to a second adjustment factor, and the first adjustment factor is greater than the second adjustment factor.

Optionally, the first adjustment factor corresponding to the facial region in the adjustment region is 1, and the second adjustment factor corresponding to the adjustment region outside the facial region is a fixed value less than 1, such as 0.5; or, the second adjustment factor corresponding to the adjustment region outside the facial region gradually transitions from 1 to 0.

In a possible implementation, the terminal calculates actual adjustment parameters according to the adjustment parameters and the first adjustment factor, so as to adjust coordinates of the block vertices in the facial region according to the actual adjustment parameters, where actual adjustment parameter=adjustment parameter×first adjustment factor.

When the coordinates of the block vertices are adjusted according to the actual adjustment parameters, after a block vertex (x1, y1) in the facial region is adjusted based on the adjustment parameters, the coordinates of the block vertex are changed to (x2, y2), where:

$$x2=(x1-center\_x)*a*mask1*adjustValue, \text{ and}$$

$$y2=(y1-center\_y)*a*mask1*adjustValue,$$

where a represents a constant coefficient, a may be set to 1.3 or be set flexibly as required; mask1 is a first adjustment factor; adjustValue represents a facial part adjustment parameter, mask1*adjustValue is an actual adjustment parameter; center_x represents an x value of the center of a block; and center_y represents a y value of the center of the block.

Step 609B: Calculate, by using the vertex shader, the displacement vector of the block vertex outside the facial region in the adjustment region according to the adjustment parameters corresponding to the adjustment region and a second adjustment factor.

For the adjustment region outside the facial region, the vertex shader adjusts the block vertices outside the facial region according to the second adjustment factor and the corresponding adjustment parameters. An adjustment range of coordinates of the block vertices in the facial region is greater than an adjustment range of coordinates of the block vertices outside the facial region.

In a possible implementation, the terminal calculates actual adjustment parameters according to the adjustment parameters and the second adjustment factor, so as to adjust the coordinates of the block vertices outside the facial region according to the actual adjustment parameters, where actual adjustment parameter=adjustment parameter×second adjustment factor.

For example, when an adjustment parameter indicates that the width of eyes is increased by 10% and a second adjustment factor is 0.5, the terminal determines that an actual adjustment parameter of a block vertex outside the eye region is 10%×0.5=5%.

When the coordinates of the block vertices are adjusted according to the actual adjustment parameters, after a block vertex (x1, y1) outside the facial region is adjusted based on the adjustment parameters, the coordinates of this block vertex are changed to (x2, y2), where:

$$x2=(x1-center\_x)*a*mask2*adjustValue, \text{ and}$$

$$y2=(y1-center\_y)*a*mask2*adjustValue,$$

where a represents a constant coefficient, a may be set to 1.3 or be set flexibly as required; mask2 is a second adjustment factor; adjustValue represents a facial part adjustment parameter, mask1*adjustValue is an actual adjustment parameter; center_x represents an x value of the center of a block; and center_y represents a y value of the center of the block.

In this embodiment, different adjustment factors are set for different subregions in the adjustment region, and the block vertices in the adjustment region are adjusted based on the adjustment factors, so that the adjustment effect of the adjustment region is more natural, thereby improving the face beautification effect.

The following describes apparatus embodiments of this application, which can be used to execute the method embodiments of this application. For details not disclosed in the apparatus embodiments of this application, refer to the method embodiments of this application.

Figure 15:
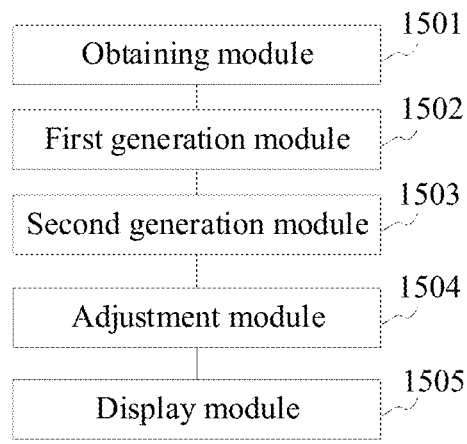
FIG. 15 shows a block diagram of a face beautification apparatus according to an embodiment of this application.

FIG. 15 shows a block diagram of a face beautification apparatus according to an embodiment of this application. The apparatus may be the terminal 120 in the implementation environment shown in FIG. 1, or may be disposed on the terminal 120. The apparatus may include:

an obtaining module 1501, configured to obtain a target face contained in a target image and a user-selected reference face;

a first generation module 1502, configured to generate adjustment parameters corresponding to the target face based on a comparison of the target face and the reference face, the adjustment parameters including face shape adjustment parameters and facial part adjustment parameters;

a second generation module 1503, configured to generate a displacement vector according to the face shape adjustment parameters and the facial part adjustment parameters, the displacement vector being used for representing a size change, a position change and an angle change in a face shape and facial parts of the target face during an adjustment process;

an adjustment module 1504, configured to adjust the face shape and the facial parts of the target face according to the displacement vector; and a display module 1505, configured to display the adjusted target face.

Optionally, the first generation module 1502 includes:

a recognition unit, configured to recognize facial keypoints of the target face;

a determining unit, configured to determine initial face parameters of the target face according to the facial keypoints, the initial face parameters including initial face shape parameters and initial facial part parameters; and a first generation unit, configured to generate the adjustment parameters according to the initial face parameters and reference face parameters corresponding to the reference face, the reference face parameters including reference face shape parameters and reference facial part parameters.

Optionally, the first generation unit is configured to:

determine a face width zooming ratio in the adjustment parameters according to an initial face aspect ratio in the initial face shape parameters and a reference face aspect ratio in the reference face shape parameters.

determine a V-line angle adjustment amount in the adjustment parameters according to an initial V-line angle in the initial face shape parameters and a reference V-line angle in the reference face shape parameters, the V-line angle being an included angle formed by a tangent line to a cheek and a tangent line to a chin;

and/or determine a chin height adjustment amount in the adjustment parameters according to an initial chin height in the initial face shape parameters and a reference chin height in the reference face shape parameters.

Optionally, the first generation unit is configured to:

determine a facial part zooming ratio in the adjustment parameters according to initial facial part ratios in the initial facial part parameters and reference facial part ratios in the reference facial part parameters, the facial part ratios including a ratio of a facial part height to a face height and a ratio of a facial part width to a face width;

and/or determine a facial part position offset amount in the adjustment parameters according to initial facial part positions in the initial facial part parameters and reference facial part positions in the reference facial part parameters;

and/or determine a facial part angle adjustment amount in the adjustment parameters according to initial facial part angles in the initial facial part parameters and reference facial part angles in the reference facial part parameters.

Optionally, the apparatus further includes:

a first division module, configured to divide the target image into blocks of a preset size; and a second division module, configured to divide the target face into adjustment regions according to key-point types of the facial key-points on the target face, the key-point types including face contour key-points and facial part key-points, and the adjustment regions including contour adjustment regions and facial part adjustment regions; and the second generation module 1503, including:

a calculation unit, configured to: for each adjustment region, calculate, by using a vertex shader, the displacement vector of a block vertex in the adjustment region during each adjustment process according to adjustment parameters corresponding to the adjustment regions; and a second generation unit, configured to generate a displacement vector graph according to the displacement vectors calculated during the adjustments, the displacement vector graph being used for representing a position change of the block vertex during a plurality of adjustment processes.

Optionally, the second division module is configured to:

divide the target face into facial regions according to the key-point types of the facial key-points, the facial regions including contour regions and facial part regions; and determine an adjustment region corresponding to each facial region, an area of the adjustment region being larger than an area of the facial region, and the facial region being located inside the adjustment region.

Optionally, the adjustment module 1504 includes:

a first adjustment unit, configured to adjust, by using the vertex shader, coordinates of the block vertex according to original coordinates of the block vertex in the adjustment region and a displacement distance and a displacement direction indicated by the displacement vector graph; and a second adjustment unit, configured to draw each pixel in the adjusted block by using a fragment shader.

Optionally, the computation unit is configured to:

calculate, by using the vertex shader, the displacement vector of the block vertex in the facial region according to the adjustment parameters corresponding to the adjustment region and a first adjustment factor; and calculate, by using the vertex shader, the displacement vector of the block vertex outside the facial region in the adjustment region according to the adjustment parameters corresponding to the adjustment region and a second adjustment factor, the first adjustment factor being greater than the second adjustment factor, and an adjustment range of coordinates of the block vertex in the facial region being greater than an adjustment range of coordinates of the block vertex outside the facial region.

Optionally, the apparatus further includes:

a template display module, configured to display at least one face template, the face template including a standard face template and/or a preset character template, the standard face template being corresponding to face parameters of a standard face, and the preset character template being corresponding to face parameters of a preset character; and a reference face determining module, configured to determine the reference face according to a selected face template in a case that a signal to select the face template is received.

In summary, in this embodiment of this application, after a target face contained in a target image is obtained, adjustment parameters corresponding to the target face are generated according to a reference face whose face shape and facial parts all meet a preset standard, and size adjustment, angle adjustment and/or position adjustment is performed on the face shape and facial parts of the target face according to the adjustment parameters, and then the adjusted target face is displayed. In this embodiment of this application, differences of different faces are taken into account, and an adjustment policy that meets features of the target face is formulated according to differences between the target face and the reference face, thereby formulating a beautification policy in a targeted manner, and improving a face beautification effect. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 16:
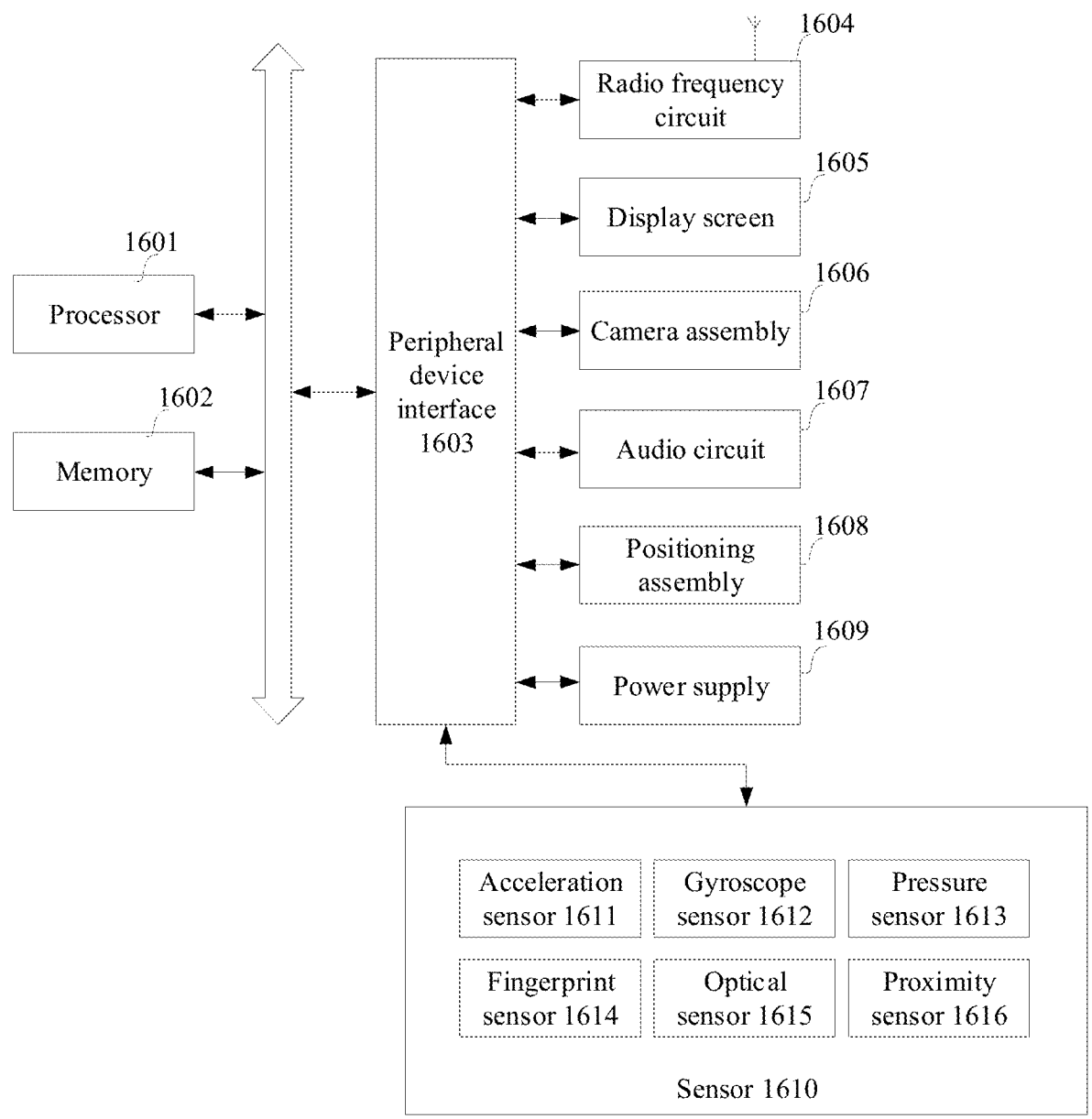
FIG. 16 shows a schematic structural diagram corresponding to a case in which a computer device is specifically implemented as a terminal according to an embodiment of this application.

FIG. 16 is a schematic structural diagram of a computer device according to an embodiment of this application. The terminal may be implemented as the terminal 120 in the implementation environment shown in FIG. 1 to implement the face beautification method provided in the foregoing embodiments. Specifically:

the terminal includes a processor 1601 and a memory 1602.

The processor 1601 may include one or more processing cores, and may be, for example, a 4-core processor or an 8-core processor. The processor 1601 may be implemented in at least one hardware form of a digital signal processor (DSP), a field-programmable gate array (FPGA), and a programmable logic array (PLA). The processor 1601 may alternatively include a main processor and a coprocessor. The main processor is a processor that is configured to process data in an awake state, also referred to as a central processing unit (CPU), and the coprocessor is a low-power processor that is configured to process data in an idle state. In some embodiments, the processor 1601 may be integrated with a graphics processing unit (GPU). The GPU is configured to be responsible for rendering and drawing content to be displayed by a display screen. In some embodiments, the processor 1601 may further include an artificial intelligence (AI) processor. The AI processor is configured to process a calculation operation related to machine learning.

The memory 1602 may include one or more computer-readable storage media. The computer-readable storage medium may be tangible and non-transient. The memory 1602 may further include a high-speed random access memory and a non-volatile memory, for example, one or more disk storage devices or flash memory devices. In some embodiments, the non-transient computer-readable storage medium in the memory 1602 is configured to store at least one instruction, and the at least one instruction is configured to be executed by the processor 1601 to implement the face beautification method provided in this application.

In some embodiments, the computer device further optionally includes a peripheral device interface 1603 and at least one peripheral device. Specifically, the peripheral device includes at least one of a radio frequency circuit 1604, a touch display screen 1605, a camera 1606, an audio circuit 1607, a positioning assembly 1608, and a power supply 1609.

The peripheral device interface 1603 may be configured to connect the at least one peripheral device related to input/output (I/O) to the processor 1601 and the memory 1602. In some embodiments, the processor 1601, the memory 1602, and the peripheral device interface 1603 are integrated on the same chip or circuit board. In some other embodiments, any one or two of the processor 1601, the memory 1602, and the peripheral device interface 1603 may be implemented on a separate chip or the circuit board. This is not limited in this embodiment.

The radio frequency circuit 1604 is configured to receive and transmit a radio frequency (RF) signal, also referred to as an electromagnetic signal. The RF circuit 1604 communicates with a communication network and another communication device by using the electromagnetic signal. The RF circuit 1604 converts an electric signal into an electromagnetic signal for transmission, or converts a received electromagnetic signal into an electric signal. Optionally, the radio frequency circuit 1604 includes an antenna system, an RF transceiver, one or more amplifiers, a tuner, an oscillator, a digital signal processor, a codec chip set, a subscriber identity module card, and the like. The RF circuit 1604 may communicate with other computer devices through at least one wireless communication protocol. The wireless communication protocol includes, but is not limited to a world wide web, a metropolitan area network, an intranet, generations of mobile communication networks (2G, 3G, 4G, and 5G), a wireless local area network and/or a wireless fidelity (Wi-Fi) network. In some embodiments, the RF circuit 1604 may further include a circuit related to a near field communication (NFC) circuit. This is not limited in this application.

The touch display screen 1605 is configured to display a user interface (UI). The UI may include a graphic, text, an icon, a video, and any combination thereof. The touch display screen 1605 also has a capability of collecting a touch signal on or above a surface of the touch display screen 1605. The touch signal may be used as a control signal to be inputted into the processor 1601 for processing. The touch display screen 1605 is configured to provide a virtual button and/or a virtual keyboard, which is also referred to as a soft button and/or a soft keyboard. In some embodiments, there is one touch display screen 1605, disposed on a front panel of the computer device. In some other embodiments, there may be at least two touch display screens 1605, respectively disposed on different surfaces of the computer device or designed in a foldable shape. In still some other embodiments, the touch display screen 1605 may be a flexible display screen, disposed on a curved surface or a folded surface of the computer device. Even, the touch display screen 1605 may be further set in a non-rectangular irregular pattern, namely, a special-shaped screen. The touch display screen 1605 may be made of a material such as a liquid crystal display (LCD) or an organic light-emitting diode (OLED).

The camera assembly 1606 is configured to collect an image or a video. Optionally, the camera assembly 1606 includes a front-facing camera and a rear-facing camera. Generally, the front-facing camera is configured to implement a video call or self-portrait. The rear-facing camera is configured to capture a picture or a video. In some embodiments, there are at least two rear-facing cameras, each of which is any one of a main camera, a depth of field camera and a wide-angle camera, so as to implement a background blurring function by fusing the main camera and the depth of field camera, and panoramic shooting and virtual reality (VR) shooting functions by fusing the main camera and the wide-angle camera. In some embodiments, the camera assembly 1606 may further include a flash. The flash may be a single color temperature flash or a double color temperature flash. The double color temperature flash refers to a combination of a warm flash and a cold flash, and may be configured to perform light ray compensation at different color temperatures.

The audio circuit 1607 is configured to provide an audio interface between a user and the terminal. The audio circuit 1607 may include a microphone and a loudspeaker. The microphone is configured to collect sound waves of a user and an environment, and convert the sound waves into electrical signals and input the electrical signals into the processor 1601 for processing, or input the electrical signals into the RF circuit 1604 to implement speech communication. For the purpose of stereo sound collection or noise reduction, there may be a plurality of microphones, respectively disposed at different portions of the terminal. The microphone may be further a microphone array or an omni-directional collection microphone. The loudspeaker is configured to convert electrical signals from the processor 1601 or the RF circuit 1604 into sound waves. The loudspeaker may be a conventional thin-film loudspeaker or a piezoelectric ceramic loudspeaker. When the loudspeaker is the piezoelectric ceramic loudspeaker, electrical signals not only can be converted into sound waves that can be heard by human, but also can be converted into sound waves that cannot be heard by human for ranging and the like. In some embodiments, the audio circuit 1607 may further include an earphone jack.

The positioning assembly 1608 is configured to position a current geographic location of the terminal, to implement a navigation or a location based service (LBS). The positioning assembly 1608 may be a positioning component based on the Global Positioning System (GPS) of the United States, the China's Beidou Navigation Satellite System (BDS), or the Galileo system of Russia.

The power supply 1609 is configured to supply power to assemblies in the terminal. The power supply 1609 may be an alternating current, a direct current, a primary battery, or a rechargeable battery. In a case that the power supply 1609 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal further includes one or more sensors 1610. The one or more sensors 1610 include, but are not limited to, an acceleration sensor 1611, a gyroscope sensor 1612, a pressure sensor 1613, a fingerprint sensor 1614, an optical sensor 1615, and a proximity sensor 1616.

A person skilled in the art may understand that a structure shown in FIG. 16 constitutes no limitation on the terminal. The terminal may include more or fewer assemblies than those shown in the drawings, some assemblies may be combined, and a different assembly may be used to construct the device.

An embodiment of this application further provides a computer-readable storage medium, storing computer-readable instructions, the computer-readable instructions being executed by a processor to perform the face beautification method according to the foregoing embodiments.

This application further provides a computer program product including instructions. The product, when run on a computer, causes the computer to perform the face beautification method according to the foregoing embodiments.

The sequence numbers of the foregoing embodiments of this application are merely for description purpose but do not indicate the preference among the embodiments.

A person of ordinary skill in the art may understand that all or some of the steps of the foregoing embodiments may be implemented by hardware, or may be implemented by a program instructing relevant hardware. The program may be stored in a computer-readable storage medium. The storage medium may be a read-only memory, a magnetic disk, an optical disc, or the like. The foregoing descriptions are merely exemplary embodiments of this application, and are not intended to limit this application. Any modification, equivalent replacement, improvement and the like made within the spirit and principle of this application shall fall within the protection scope of this application.

What is claimed is:

1. A face beautification method, performed by a computer device, the method comprising:
   obtaining a target face contained in a target image and a user-selected reference face;
   determining initial face parameters of the target face, the initial face parameters including:
      an initial face aspect ratio; and
      initial facial part ratios between two distinct facial parts of the target face; and
   generating adjustment parameters according to the initial face parameters corresponding to the target face and reference face parameters corresponding to the reference face, the adjustment parameters including:
      a face width scaling adjustment parameter that is determined according to the initial face aspect ratio of the target face and a reference face aspect ratio of the reference face; and
      facial part scaling adjustment parameters that are determined according to the initial facial part ratios of the target face and reference facial part ratios in the reference face;
   adjusting a face shape and facial parts of the target face according to the face width scaling adjustment parameter and the facial part scaling adjustment parameters jointly; and
   displaying the adjusted target face.

2. The method according to claim 1, wherein generating the adjustment parameters further comprises:
   recognizing facial key-points of the target face;
   determining the initial face parameters of the target face according to the facial key-points, the initial face parameters comprising initial face shape parameters and initial facial part parameters; and
   generating the adjustment parameters according to the initial face parameters corresponding to the target face and the reference face parameters corresponding to the reference face, the reference face parameters comprising reference face shape parameters and reference facial part parameters.

3. The method according to claim 2, wherein generating the adjustment parameters further comprises:
   determining a V-line angle adjustment amount in the adjustment parameters according to an initial V-line angle in the initial face shape parameters and a reference V-line angle in the reference face shape parameters, the V-line angle being an included angle formed by a tangent line to a cheek and a tangent line to a chin.

4. The method according to claim 2, wherein generating the adjustment parameters further comprises:
   determining a chin height adjustment amount in the adjustment parameters according to an initial chin height in the initial face shape parameters and a reference chin height in the reference face shape parameters.

5. The method according to claim 2, wherein generating the adjustment parameters further comprises:
   determining a facial part position offset amount in the adjustment parameters according to initial facial part positions in the initial facial part parameters and reference facial part positions in the reference facial part parameters.

6. The method according to claim 2, wherein generating the adjustment parameters further comprises:
   determining a facial part angle adjustment amount in the adjustment parameters according to initial facial part angles in the initial facial part parameters and reference facial part angles in the reference facial part parameters.

7. The method according to claim 1, wherein the initial facial part ratios and the reference facial part ratios comprise a ratio of a facial part height to a face height and a ratio of a facial part width to a face width.

8. The method according to claim 1, further comprising:
   generating a displacement vector according to the face width scaling adjustment parameter and the facial part scaling adjustment parameters, wherein the displacement vector is used to represent a size change, a position change, and an angle change in the face shape and the facial parts of the target face during the adjusting; and
   the method further comprises:
   before generating the displacement vector:
      dividing the target image into blocks of a preset size;
      dividing the target face into adjustment regions according to key-point types of the facial key-points on the target face, the key-point types comprising face contour key-points and facial part key-points, and the adjustment regions comprising contour adjustment regions and facial part adjustment regions; and
   generating the displacement vector further comprises:
      for each adjustment region, calculating, by using a vertex shader, the displacement vector of a block vertex in the adjustment region during each adjustment process according to adjustment parameters corresponding to the adjustment regions; and
      generating a displacement vector graph according to the displacement vectors calculated during the adjustment processes, the displacement vector graph being used for representing a position change of the block vertex during a plurality of adjustment processes.

9. The method according to claim 8, wherein the dividing the target face into adjustment regions according to key-point types of the facial key-points on the target face comprises:
dividing the target face into facial regions according to the key-point types of the facial key-points, the facial region comprising contour regions and facial part regions; and
determining an adjustment region corresponding to each facial region, an area of the adjustment region being larger than an area of the facial region, and the facial region being located inside the adjustment region.

10. The method according to claim 9, wherein the calculating, by using a vertex shader, the displacement vector of a block vertex in the adjustment region during each adjustment process according to adjustment parameters corresponding to the adjustment regions comprises:
calculating, by using the vertex shader, the displacement vector of the block vertex in the facial region according to the adjustment parameters corresponding to the adjustment region and a first adjustment factor; and
calculating, by using the vertex shader, the displacement vector of the block vertex outside the facial region in the adjustment region according to the adjustment parameters corresponding to the adjustment region and a second adjustment factor, the first adjustment factor being greater than the second adjustment factor, and an adjustment range of coordinates of the block vertex in the facial region being greater than an adjustment range of coordinates of the block vertex outside the facial region.

11. The method according to claim 8, further comprising adjusting the face shape and the facial parts of the target face according to the displacement vector, including:
adjusting, by using the vertex shader, coordinates of the block vertex according to original coordinates of the block vertex in the adjustment region and a displacement distance and a displacement direction indicated by the displacement vector graph; and
drawing each pixel in the adjusted block by using a fragment shader.

12. The method according to claim 1, further comprising:
after obtaining the target face contained in a target image:
displaying at least one face template, the face template comprising a standard face template and/or a preset character template, the standard face template corresponding to face parameters of a standard face, and the preset character template corresponding to face parameters of a preset character; and
determining the reference face according to a selected face template in accordance with a determination that a signal to select the face template is received.

13. A computer device, comprising a processor and a memory, the memory storing computer-readable instructions, the computer-readable instructions, when executed by the processor, causing the computer device to perform a plurality of operations including:
obtaining a target face contained in a target image and a user-selected reference face;
determining initial face parameters of the target face, the initial face parameters including:
an initial face aspect ratio; and
initial facial part ratios between two distinct facial parts of the target face; and
generating adjustment parameters according to the initial face parameters corresponding to the target face and reference face parameters corresponding to the reference face, the adjustment parameters including:
a face width scaling adjustment parameter that is determined according to the initial face aspect ratio of the target face and a reference face aspect ratio of the reference face; and
facial part scaling adjustment parameters that are determined according to the initial facial part ratios of the target face and reference facial part ratios in the reference face;
adjusting a face shape and facial parts of the target face according to the face width scaling adjustment parameter and the facial part scaling adjustment parameters jointly; and
displaying the adjusted target face.

14. The computer device according to claim 13, wherein generating the adjustment parameters further comprises:
recognizing facial key-points of the target face;
determining the initial face parameters of the target face according to the facial key-points, the initial face parameters comprising initial face shape parameters and initial facial part parameters; and
generating the adjustment parameters according to the initial face parameters corresponding to the target face and the reference face parameters corresponding to the reference face, the reference face parameters comprising reference face shape parameters and reference facial part parameters.

15. The computer device according to claim 13, wherein the plurality of operations further comprise:
generating a displacement vector according to the face width scaling adjustment parameter and the facial part scaling adjustment parameters, wherein the displacement vector is used to represent a size change, a position change, and an angle change in the face shape and the facial parts of the target face during the adjusting;
before generating the displacement vector:
dividing the target image into blocks of a preset size;
dividing the target face into adjustment regions according to key-point types of the facial key-points on the target face, the key-point types comprising face contour key-points and facial part key-points, and the adjustment regions comprising contour adjustment regions and facial part adjustment regions; and
generating the displacement vector further comprises:
for each adjustment region, calculating, by using a vertex shader, the displacement vector of a block vertex in the adjustment region during each adjustment process according to adjustment parameters corresponding to the adjustment regions; and
generating a displacement vector graph according to the displacement vectors calculated during the adjustment processes, the displacement vector graph being used for representing a position change of the block vertex during a plurality of adjustment processes.

16. The computer device according to claim 13, wherein the plurality of operations further comprise:
after obtaining the target face contained in a target image:
displaying at least one face template, the face template comprising a standard face template and/or a preset character template, the standard face template corresponding to face parameters of a standard face, and the preset character template corresponding to face parameters of a preset character; and determining the reference face according to a selected face template in accordance with a determination that a signal to select the face template is received.

17. A non-transitory computer-readable storage medium, storing computer-readable instructions, the computer-readable instructions, when executed by one or more processors of a computer device, cause the computer device to perform a plurality of operations including:
 obtaining a target face contained in a target image and a user-selected reference face;
 determining initial face parameters of the target face, the initial face parameters including:
  an initial face aspect ratio; and
  initial facial part ratios between two distinct facial parts of the target face; and
 generating adjustment parameters according to the initial face parameters corresponding to the target face and reference face parameters corresponding to the reference face, the adjustment parameters including:
  a face width scaling adjustment parameter that is determined according to the initial face aspect ratio of the target face and a reference face aspect ratio of the reference face; and
  facial part scaling adjustment parameters that are determined according to the initial facial part ratios of the target face and reference facial part ratios in the reference face;
 adjusting a face shape and facial parts of the target face according to the face width scaling adjustment parameter and the facial part scaling adjustment parameters jointly; and
 displaying the adjusted target face.

18. The non-transitory computer-readable storage medium according to claim 17, wherein the plurality of operations further comprise:
 generating a displacement vector according to the face width scaling adjustment parameter and the facial part scaling adjustment parameters, wherein the displacement vector is used to represent a size change, a position change, and an angle change in the face shape and the facial parts of the target face during the adjusting;
 before generating the displacement vector:
 dividing the target image into blocks of a preset size;
 dividing the target face into adjustment regions according to key-point types of the facial key-points on the target face, the key-point types comprising face contour key-points and facial part key-points, and the adjustment regions comprising contour adjustment regions and facial part adjustment regions; and
 generating the displacement vector comprises:
 for each adjustment region, calculating, by using a vertex shader, the displacement vector of a block vertex in the adjustment region during each adjustment process according to adjustment parameters corresponding to the adjustment regions; and
 generating a displacement vector graph according to the displacement vectors calculated during the adjustment processes, the displacement vector graph being used for representing a position change of the block vertex during a plurality of adjustment processes.

19. The non-transitory computer-readable storage medium according to claim 17, wherein the plurality of operations further comprise:
 after obtaining the target face contained in a target image:
  displaying at least one face template, the face template comprising a standard face template and/or a preset character template, the standard face template corresponding to face parameters of a standard face, and the preset character template corresponding to face parameters of a preset character; and
  determining the reference face according to a selected face template in accordance with a determination that a signal to select the face template is received.

* * * * *